United States Patent
Akahori et al.

[11] Patent Number: 5,266,696
[45] Date of Patent: Nov. 30, 1993

[54] 1-AMINOANTHRAQUINONE DYE COMPOUND HAVING FIBER REACTIVE GROUP THROUGH SULFUR OR OXYGEN ATOM AT 4-POSITION AND IMPARTING RED COLOR

[75] Inventors: Kingo Akahori, Toyonaka; Naoki Harada, Suita; Yutaka Kayane, Ibaraki; Takashi Omura, Kobe, all of Japan

[73] Assignee: Sumitomo Chemical Company, Limited, Osaka, Japan

[21] Appl. No.: 836,825

[22] Filed: Feb. 19, 1992

Related U.S. Application Data

[62] Division of Ser. No. 386,699, Jul. 31, 1989, Pat. No. 5,112,971.

Foreign Application Priority Data

| Aug. 10, 1988 | [JP] | Japan | 63-200793 |
| Sep. 1, 1988 | [JP] | Japan | 63-219516 |
| Sep. 2, 1988 | [JP] | Japan | 63-220844 |

[51] Int. Cl.$^5$ ............ C07D 251/70; C09B 62/06; C09B 62/505; D06P 1/382; D06P 1/384
[52] U.S. Cl. ............ 544/189; 544/187
[58] Field of Search ............ 544/187, 189

[56] References Cited

U.S. PATENT DOCUMENTS

| 4,464,297 | 8/1984 | Omura et al. | 544/187 X |
| 4,505,714 | 3/1985 | Omura et al. | 544/187 X |
| 4,511,507 | 4/1985 | Kayane et al | 544/187 X |
| 4,530,996 | 7/1985 | Omura et al. | 544/187 X |
| 4,540,418 | 9/1985 | Otake et al. | 544/187 X |
| 4,548,612 | 10/1985 | Kayane et al. | 544/187 X |
| 4,551,150 | 11/1985 | Otake et al. | 544/187 X |
| 4,607,102 | 8/1986 | Nishikuru et al. | 544/187 X |
| 4,618,671 | 10/1986 | Kayane et al. | 544/187 X |
| 4,649,193 | 3/1987 | Meininger et al. | 544/187 X |
| 4,701,524 | 10/1987 | Kayane et al. | 544/187 X |
| 4,812,558 | 3/1989 | Omura et al. | 544/187 X |
| 4,879,372 | 11/1989 | Morimitsu et al. | 544/187 X |
| 4,977,261 | 12/1990 | Kayane et al. | 544/187 |
| 5,112,971 | 5/1992 | Akahori et al. | 544/187 X |

FOREIGN PATENT DOCUMENTS

| 0616686 | 10/1962 | Belgium | 544/187 |
| 0064250 | 11/1982 | European Pat. Off. | 544/187 |
| 0070807 | 1/1983 | European Pat. Off. | 544/187 |
| 2113977 | 10/1971 | Fed. Rep. of Germany | 544/187 |
| 2854481 | 6/1980 | Fed. Rep. of Germany | 544/187 |
| 1211910 | 3/1960 | France | 544/187 |
| 1320423 | 1/1963 | France | 544/187 |

*Primary Examiner*—Floyd D. Higel
*Attorney, Agent, or Firm*—Stevens, Davis, Miller & MOsher

[57] ABSTRACT

Anthraquinone compounds of the formula,

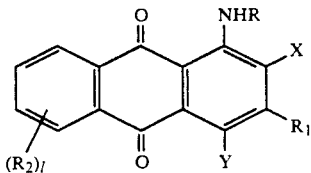

wherein R is hydrogen, alkyl or the like, $R_1$ and $R_2$ are each hydrogen, halogen or sulfo, l is 1 or 2, X is sulfo or the like or $-V-A-(W)_m-Z$, and Y is $-V_1-A_1-U$, wherein V and $V_1$ are each $-O-$ or $-S-$, A and $A_1$ are each a divalent group such as

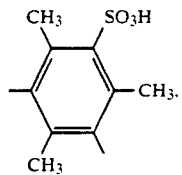

W is $-NH-$ or the like, Z is hydrogen or a fiber reactive group, and U is hydrogen, a fiber reactive group or a fiber reactive group-containing group, provided that at least one of Z and U is or has a fiber reactive group, which is useful for dyeing or printing fiber materials such as cotton to give a dyed or printed product having excellent fastness properties, particularly those such as light fastness and perspiration-light fastness.

24 Claims, No Drawings

1-AMINOANTHRAQUINONE DYE COMPOUND HAVING FIBER REACTIVE GROUP THROUGH SULFUR OR OXYGEN ATOM AT 4-POSITION AND IMPARTING RED COLOR

This is a division of application Ser. No. 07/386,699, filed Jul. 31, 1989, now U.S. Pat. No. 5,112,971.

The present invention relates to an anthraquinone compound, a process for producing the same and a process for dyeing or printing fiber materials therewith.

More specifically, the present invention relates to an anthraquinone compound having at least one fiber reactive group, which is useful for dyeing or printing fiber materials.

Many fiber reactive anthraquinone dyes of this kind are known, for example, as disclosed in Published Unexamined Japanese Patent Application No. 3834/1971.

However, these existing anthraquinone fiber reactive dyes have difficulty meeting all of the needs of dye consumers with recent changes in the technical and economical situations thereof. For example, dye consumers are still waiting for improvements with respect to the dyeing property which is a fundamental condition for the dye, and the fastness properties of the dyed or printed products, because of high demand for such properties in recent years.

The present inventors have made extensive studies to find an anthraquinone compound meeting the needs described above, and found that this object can be accomplished by providing an anthraquinone compound having a specific chromophore and a specific bridging group between the chromophore and a fiber reactive group.

The present invention provides an anthraquinone compound represented by the following formula (I),

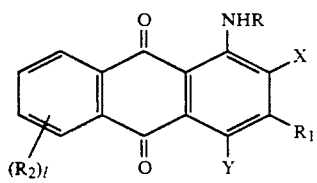

wherein R is hydrogen or unsubstituted or substituted alkyl, cyclohexyl, phenyl, alkylcarbonyl, arylcarbonyl, alkylsulfonyl or arylsulfonyl;

$R_1$ and $R_2$ independently of one another are each hydrogen, halogen or sulfo;

$l$ is 1 or 2;

X is hydrogen, alkyl, halogen, carboxy, sulfo or group of the formula (1), $-V-A-(W)_m-Z$; and Y is a group of the formula (2) $-V_1-A_1-U$; in which formulas (1) and (2), Z is hydrogen or a fiber-reactive group, W is a divalent group of $-O-$, $-S-$, $-NR_3-$ or $-NR_4CO-$ in which $R_3$ and $R_4$ independently of one another are each hydrogen or unsubstituted or substituted alkyl, m is 0 or 1, U is a group of the following formula (3) or (4), the formula (3) being $-(W_1)_{l_1} Z_1$ wherein $W_1$ is a divalent group of $-O-$, $-S-$, $-NR_5-$ or $-NR_6CO-$ in which $R_5$ and $R_6$ independently of one another are each hydrogen or unsubstituted or substituted alkyl, $Z_1$ is hydrogen or a fiber-reactive group, and $l_1$ is 0 or 1, and the formula (4) being

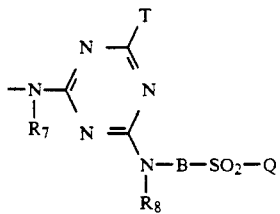

wherein $R_7$ and $R_8$ independently of one another are each hydrogen or unsubstituted or substituted alkyl, B is unsubstituted or substituted phenylene or naphthylene, Q is vinyl or $-CH_2CH_2L$ in which L is a group capable of being split by the action of an alkali, and T is fluoro, chloro or a group of the following formula (5), (6), (7) or (8), the formula (5) being

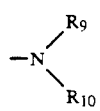

wherein $R_9$ and $R_{10}$ independently of one another are each hydrogen or unsubstituted or substituted alkyl, phenyl, naphthyl or benzyl, the formula (6) being

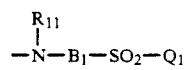

wherein $R_{11}$ is hydrogen or unsubstituted or substituted alkyl, $B_1$ is unsubstituted or substituted phenylene or naphthylene, and $Q_1$ is vinyl or $-CH_2CH_2L_1$ in which $L_1$ is a group capable of being split by the action of an alkali, the formula (7) being

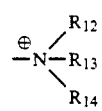

wherein $R_{12}$, $R_{13}$ and $R_{14}$ independently of one another are each unsubstituted or substituted alkyl or phenyl, and the formula (8) being

wherein $R_{15}$ is hydrogen, cyano, carbamoyl, halogen, hydroxy, vinyl, sulfo, carboxy or unsubstituted or substituted alkyl, A and $A_1$ independently of one another are each a group of the following formula (9), (10), (11) or (12), the formula (9) being

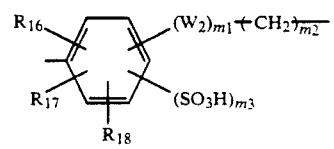

wherein $R_{16}$, $R_{17}$ and $R_{18}$ independently of one another are each hydrogen, methyl, ethyl, methoxy, ethoxy, chloro, bromo or carboxyl, W₂ is a divalent group of —O—, —S—, —NR₁₉— or —NR₂₀CO— in which R₁₉ and R₂₀ independently of one another are each hydrogen or unsubstituted or substituted alkyl, m₁ is 0 or 1, m₂ is 0, 1, 3 or 4, and m₃ is 0, 1 or 2, the formula (10) being

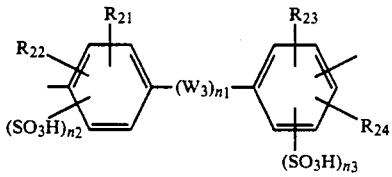

wherein R₂₁, R₂₂, R₂₃ and R₂₄ independently of one another are each hydrogen, methyl, ethyl, methoxy, ethoxy, chloro, bromo or carboxy, W₃ is a bridging group of —O—, —S—, —NR₂₅— or —NR₂₆CO— in which R₂₅ and R₂₆ independently of one another are each hydrogen or unsubstituted or substituted alkyl, n₁ is 0 or 1, and n₂ and n₃ are each 0, 1 or 2, the formula (11) being

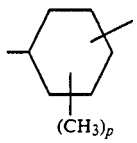

wherein
p is 0, 1, 2 or 3, and
the formula (12) being $+CH_2)_q$ wherein q is an integer of 2 to 6, and
V and V₁ independently of one another are each a devalent group of —O— or —S—, with the proviso that (a) Z₁ in the formula (3) is the fiber-reactive group as defined hereinabove when X is hydrogen, alkyl, halogen or carboxy, (b) at least one of Z and Z₁ is the fiber-reactive group as defined hereinabove when X and U in the formula (2) are the groups of the formula (1) and (3), respectively, (c) R₁ is hydrogen, R₂ is hydrogen or sulfo and U is the group of the formula (4) as defined hereinabove, when X is sulfo, (d) m is 0 when Z is hydrogen, and l₁ is 0 when Z₁ is hydrogen, and (e) at least one of R, A and A₁ is a sulfo-carrying group.

The present invention also provides a process for producing the compound of the formula (I), and a process for dyeing or printing fiber materials using the compound of the formula (I).

Considering the provisos as defined hereinabove, the formula (I) can be divided into the following formulas (II) to (IV),

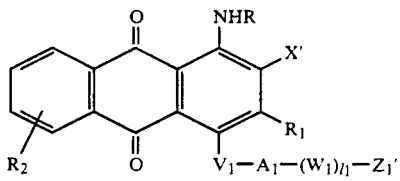

wherein X' is hydrogen, halogen, alkyl or carboxy, Z₁' is a fiber reactive group, and the other symbols stand for the same meanings as defined above, respectively;

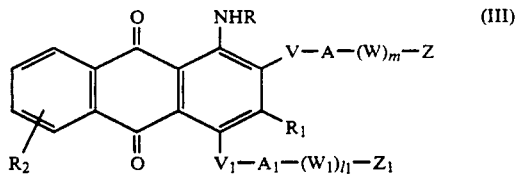

wherein all symbols stand for the same meanings as defined above, respectively, provided that at least one of Z and Z₁ is a fiber reactive group, and m is 0 when Z is hydrogen, and l₁ is 0 when Z₁ is hydrogen; and

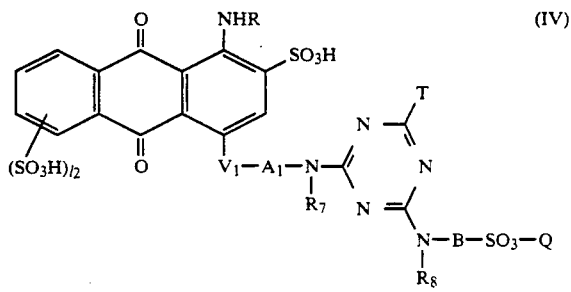

wherein l₂ is 0, 1 or 2, and all the other symbols stand for the same meanings as defined above, respectively; with the proviso that at least one of R, A and A₁ is sulfo or a sulfo-carrying group.

In the above formulas (I) to (IV), the substituent, if any, of the alkyl, cyclohexyl, phenyl, alkylcarbonyl, arylcarbonyl, alkylsulfonyl and arylsulfonyl represented by R includes methyl, ethyl, methoxy, ethoxy, chloro, bromo, acetylamino, propionylamino, nitro, cyano, carbamoyl, carboxy, hydroxy, sulfato, sulfo and the like. Those represented by R may be unsubstituted or substituted thereby preferably once or twice.

Preferable examples of those represented by R are methyl, ethyl, propyl, iso-propyl, butyl, iso-butyl, carboxymethyl, 2-carboxyethyl, 2-sulfoethyl, 2-methoxyethyl, 2-ethoxyethyl, 2-hydroxyethyl, 2-sulfatoethyl, cyclohexyl, acetyl, propionyl, benzoyl, 2-, 3- or 4-sulfobenzoyl, 2-, 3- or 4-carboxybenzoyl, 2-, 3- or 4-chlorobenzoyl, 2-, 3- or 4-methoxybenzoyl, 2-, 3- or 4-methylbenzoyl, methylsulfonyl, ethylsulfonyl, phenylsulfonyl, 2-, 3- or 4-methylphenylsulfonyl, 2-, 3- or 4-chlorophenylsulfonyl, 2-, 3- or 4-sulfophenylsulfonyl, 2-, 3- or 4-carboxyphenylsulfonyl, 2-, 3- or 4-methoxyphenylsulfonyl, phenyl, 2-, 3- or 4-sulfophenyl, 2-, 3- or 4-methylphenyl, 2-, 3- or 4-chlorophenyl, 2-, 3- or 4-methoxyphenyl, 2-, 3- or 4-carboxyphenyl and the like.

In the above formulas (I) to (III), preferably R₁ is hydrogen and R₂ is hydrogen or sulfo.

The divalent groups represented by W and W₁ in the formulas (1) and (3) are preferably —NR₃— and —NR₅— in which R₃ and R₅ are as defined above, respectively. The alkyls represented by both R₃ and R₅ are preferably C₁~C₄ alkyls unsubstituted or substituted by hydroxy, cyano, C₁~C₄ alkoxy, chloro, bromo, carboxy, carbamoyl, C₁~C₄ alkoxycarbonyl, C₁~C₄ alkylcarbonyloxy, sulfo, sulfamoyl or the like. Of these, preferred R₃ and R₅ are hydrogen, methyl and ethyl.

Among the groups represented by A and $A_1$, preferred are those of the formula (9) wherein $W_2$ is —O—, —NH— or —NHCO—, $m_2$ is 0, 1 or 2, and $m_1$ and $m_3$ are each 0 or 1, those of formula (10) wherein $W_3$ is —O—, —NH— or —NHCO—, and $n_2$ and $n_3$ are each 1 or 2, those of the formula (11) wherein p is 0, 1 or 2, and those of the formula (12) wherein q is 2, 3 or 4.

The alkyl represented by $R_7$ and $R_8$ in the formula (4) and $R_{11}$ in the formula (6) includes those disclosed in Published Unexamined Japanese Patent Application No. 176355/1984. In the present invention, $R_7$ is preferably hydrogen or methyl, and $R_8$ and $R_{11}$ are each hydrogen, methyl or ethyl.

Examples of the phenylene and naphthylene represented by B and $B_1$ are as shown below:

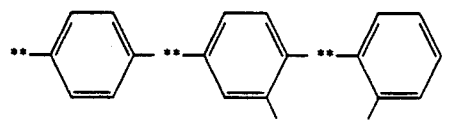
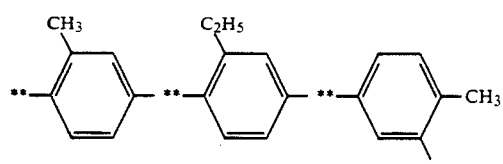
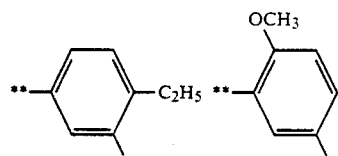
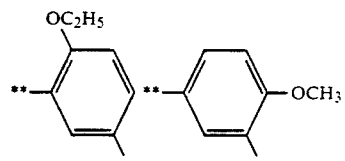
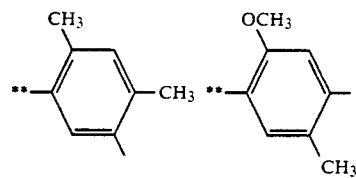
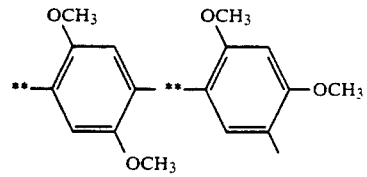
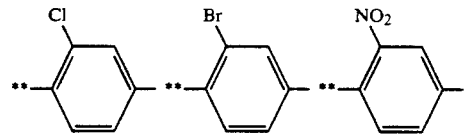
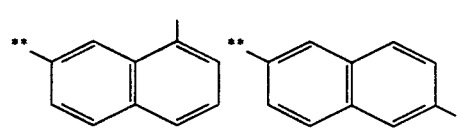

-continued

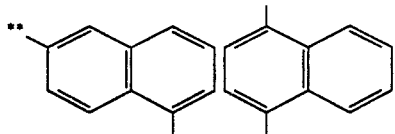
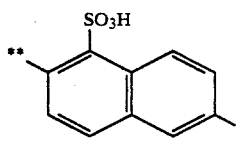
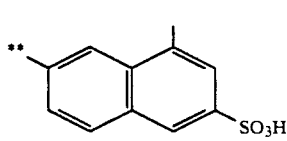
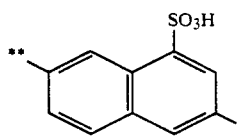

wherein the linkage marked with ** bonds to —$NR_8$— or $NR_{11}$. Among those exemplified above, particularly preferred are phenylene unsubstituted or substituted by methyl or methoxy, and β-naphthylene unsubstituted or substituted by sulfo.

The group which is capable of being split by the action of an alkali and represented by L and $L_1$ when Q and $Q_1$ are —$CH_2CH_2L$ and —$CH_2CH_2L_1$, respectively, is well known in the art, and includes, for example, sulfato, thiosulfato, acetoxy and chloro. Of these, particularly preferred is β-sulfatoethyl which may be partially replaced by vinyl.

With respect to the symbol T in the formula (4), the alkyl represented by $R_9$ and $R_{10}$ preferably includes alkyls having 1 to 4 carbon atoms, which are unsubstituted or substituted once or twice by $C_1 \sim C_4$ alkoxy, sulfo, carboxy, hydroxy, chloro, phenyl or sulfato. Examples thereof are methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl and the like.

The phenyl represented by $R_9$ and $R_{10}$ preferably includes phenyls which are unsubstituted or substituted once or twice by $C_1 \sim C_4$ alkyl, $C_1 \sim C_4$ alkoxy, sulfo, carboxy or chloro. Examples thereof are phenyl, 2-, 3- or 4-sulfophenyl, 2-, 3- or 4-carboxyphenyl, 2-, 3- or 4-chlorophenyl, 3,4-, 3,5- or 3,6-disulfophenyl and the like.

The naphthyl represented by $R_9$ and $R_{10}$ preferably includes naphthyls which are unsubstituted or substituted once, twice or three times by hydroxy, carboxy, sulfo, $C_1 \sim C_4$ alkyl, $C_1 \sim C_4$ alkoxy or chloro. Examples thereof are 2-, 3-, 4-, 5-, 6-, 7- or 8-sulfo-1-naphthyl, 1-, 5-, 6-, 7- or 8-sulfo-2-naphthyl, 5,7-, 6,8-, 4,8-, 4,7-, 3,8-, 4,6-, 3,7- or 3,6-disulfo-2-naphthyl, 4,6,8-, 2,4,7- or 3,6,8- trisulfo-1-naphthyl, 1,5,7-, 4,6,8- or 3,6,8-trisulfo-2-naphthyl and the like.

The benzyl represented by $R_9$ and $R_{10}$ preferably includes benzyls which are unsubstituted or substituted once or twice by $C_1 \sim C_4$ alkyl, $C_1 \sim C_4$ alkoxy, sulfo or chloro. Examples thereof are benzyl, 2-, 3- or 4-sulfobenzyl and the like.

In the above formula (7), $R_{12}$ and $R_{13}$ are each preferably methyl, and $R_{14}$ is preferably methyl, ethyl, propyl, butyl, hydroxyethyl, hydroxypropyl, methoxyethyl, ethoxyethyl, 2-diethylaminoethyl, 3-diethylaminopropyl, carboxymethyl and carboxyethyl. Of these, particularly preferred is the $C_1 \sim C_4$ alkyl.

In the above formula (8), $R_{15}$ is preferably hydrogen, carbamoyl and carboxy.

Amont those represented by T in the formula (4), particularly preferred are chloro, and those represented by the formula (5) wherein $R_9$ is hydrogen, methyl or ethyl, and $R_{10}$ is the phenyl as exemplified above.

Among the divalent groups represented by $V_1$ in the formula (2), particularly preferred is —S—.

In the present invention, the fiber reactive groups represented by Z and $Z_1$ include those capable of reacting with —OH or —NH— groups present in the fiber under certain dyeing conditions to form a covalent bond.

More specifically, the fiber reactive groups include aromatic ones having at least one fiber reactive substituent on 5- or 6-membered aromatic hetercyclic ring or mono- or poly-condensed aromatic carbocyclic ring, aliphatic ones and those formed by combination thereof through a suitable bridging group. The heterocyclic ring includes, for example, monoazines, diazines and triazines such as pyridine, pyrimidine, pyridazine, pyrazine, thiazine, oxazine, asymmetric or symmetric triazine and the like, and the carbocyclic ring includes, for example, quinoline, phthalazine, cinnoline, quinazoline, quinoxaline, acridine, phenazine, phenanthridine and the like.

The fiber reactive substituent on the heterocyclic and carbocyclic rings includes halogen (i.e. chlorine, bromine, fluorine), ammonium including hydrzinium, sulfonium, sulfonyl, azido (—$N_2$), thiocyanate, thio, thioether, oxyether, sulfino, sulfo and the like.

As such heterocyclic and carbocyclic ring fiber reactive groups, there are exemplified 2,4-difluorotriazin-6-yl, 2,4-dichlorotriazin-6-yl and monohalo-s-triazinyl groups, particularly monochloro- or monofluoro-triazinyl groups substituted by alkyl, aryl, amino, monoalkylamino, dialkylamino, aralkylamino, arylamino, alkoxy, aryloxy, alkylthio or arylthio, such as, for example, 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulfoethylamino-4-fluorotriazin-6-yl, 2-carboxymethylamino-4-fluorotriazin-6-yl, 2-di-(carboxymethylamino)-4-fluorotriazin-6-yl, 2-sulfomethylmethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(β-sulfobenzyl)amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulfophenyl)-amino-4-fluorotriazin-6-yl, 2-(2',5'-disulfophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulfophenyl)-amino-4-fluorotriazin-6-yl, 2-(2'-methyl-5'-sulfophenyl)-amino-4-fluorotriazin-6-yl, 2-(2'-chloro-4'-sulfophenyl)-amino-4-fluorotriazin-6-yl, 2-(2'-chloro-5'-sulfophenyl)-amino-4-fluorotriazin-6-yl, 2-(2'-methoxy-4'-sulfophenyl)-amino-4-fluorotriazin-6-yl, 2-(o-, m- or p-carboxyphenyl)-amino-4-fluorotriazin-6-yl, 2-(2',4'-disulfophenyl)-amino-4-fluorotriazin-6-yl, 2-(3',5'-disulfophenyl)-amino-4-fluorotriazin-6-yl, 2-(2'-carboxy-4'-sulfophenyl)-amino-4-fluorotriazin-6-yl, 2-(2'-carboxy-5'-sulfophenyl)-amino-4-fluorotriazin-6-yl, 2-(6'-sulfophen-2'-yl)-amino-4-fluorotriazin-6-yl, 2-(4',8'-disulfonaphth-2'-yl)-amino-4-fluorotriazin-6-yl, 2-(6',8'-disulfonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulfonaphth-2'-yl)-4-fluorotriazin-6-yl, 2-(3',6',8'-trisulfonaphth-2'-yl)-4-fluorotriazin-6-yl, 2-(3',6'-disulfonaphth-1'-yl)-4-fluorotriazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, 2-methoxy-4-fluorotriazin-6-yl, 2-ethoxy-4-fluorotriazin-6-yl, 2-phenoxy-4-fluorotriazin-6-yl, 2-(o-, m- or p-sulfophenoxy)-4-fluorotriazin-6-yl, 2-(o-, m- or p-methyl or methoxyphenyl)-4-fluorotriazin-6-yl, 2-β-hydroxyethylmercapto-4-fluorotriazin-6-yl, 2-phenylmercapt-4-fluorotriazin-6-yl, 2-(4'-methylphenyl)-mercapto-4-fluorotriazinyl, 2-(2',4'-dinitrophenyl)-mercapto-4-fluorotriazin-6-yl, 2-methyl-4-fluorotriazin-6-yl, 2-phenyl-4-fluorotriazin-6-yl, the corresponding 4-chloro- or 4-bromotriazinyl groups, and the other groups corresponding to the above wherein the halo is substituted with tertiary amines such as trimethylamine, triethylamine, dimethyl-β-hydroxyethylamine, triethanolamine, N,N-dimethylhydrazine, pyridine and pycoline, nicotinic acid, isonicotinic acid, sulfinates particularly such as benzene-sulfinate, or hydrogensulfites; mono-, di- or trihalo-pyrimidinyl groups such as 2,4-dichloropyrimidin-6-yl, 2,3,5-trichloropyrimidine-6-yl, 2,4-dichloro-5-nitro, methyl-, carboxymethyl-, carboxy-, cyano, vinyl-, sulfo-, mono-, di- or trichloromethyl- or carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl and 2,4-dichloropyrimidine-5-sulfonyl; 2-chloro-quinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -carbonyl; 2,4-dichloroquinazoline-7- or 6-sulfonyl or -carbonyl, 2-, 3-, or 4-(4',5'-dichloropyridaz-6'-on-1'-yl)phenylsulfonyl or -phenylcarbonyl, β-(4',5'-dichloropyridaz-6'-on-1'-yl)-ethylcarbonyl, N-methyl-N-(2,3-dichloroquinoxaline-6-sulfonyl)-aminoacetyl, N-methyl-N-(2,3-dichloroquinoxaline-6-carbonyl)-aminoacetyl, and the bromine or fluorine derivatives corresponding to the above chloro-substituted heterocyclic groups, such as, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-ethyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or -methylsulfonylmethyl-4-pyrimidinyl, 2-fluoro-5-carboxamid-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamid-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl, 2-fluoro-5-chloropyrimidin-4-yl, 2-methyl-4-fluoro-5-methylsulfonyl pyrimidin-6-yl, 2,6-difluoro-5-methylsulfonyl-4-pyrimidinyl, 2,6-dichlor-5-methylsulfonyl-4-pyrimidinyl, 2-fluoro-5-sulfonamide-4-pyrimidinyl, 2-fluoro-5-chloro-6-carbomethoxy-4-pyrimidinyl and 2,6-difluoro-5-trifluoromethyl-4-pyrimidinyl, sulfonyl-containing triazine groups such as 2,4-bis-(phenylsulfonyl)-triazin-6-yl, 2-(3'-carboxyphenyl)-sulfonyl-4-chlorotriazin-6-yl, 2-(3'-sulfophenyl)sulfonyl-4-chlorotriazin-6-yl and 2,4-bis(3'-carboxyphenylsulfonyl)-triazin-6-yl, sulfonyl-containing pyrimidine groups such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis-methylsulfonylpyrimidin-4-yl, 2,6-bis-methylsulfonyl-5-chloropyrimidin-4-yl, 2,4-bis-methylsulfonyl-pyrimidin-5-sulfonyl, 2-methylsulfonyl-pyrimidin-4-yl, 2-phenylsulfonylpyrimidin-4-yl, 2-trichloromethylsulfonyl-6-methylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidin-5-sulfonyl, 2-methylsulfonyl-5-nitro-6-methylpyrimidin-4-yl, 2,5,6-tris-methylsulfonylpyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bis-methylsulfonyl-5-chloro-pyrimidin-4-yl, 2-methylsulfonyl-6-carboxypyrimidin-4-yl, 2-methylsulfonyl-5-sulfopyrimidin-4-yl, 2-methylsulfonyl-6-carbomethoxy-pyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2-methylsulfonyl-6-chloropyrimidin-4- or 5-carbonyl, 2,6-bis-(methylsulfonyl)-pyrimidin-4- or 5-carbonyl, 2-ethylsulfonyl-6-chloropyrimidin-5-sulfonyl, 2,4-bis-(methylsulfonyl)-pyrimidin-5-sulfonyl, and 2-methylsulfonyl-4-chloro-6-methylpyrimidin-5-sulfonyl or -carbonyl, 2-chlorobenzothiazol-5- or 6-carbonyl or 5- or 6-sulfonyl, and 2-aryl- or alkyl-sulfonyl-benzothiazol-5- or 6-carbonyl or -sulfonyl such as 2-phenylsulfonylbenzothiazol-5- or 6-carbonyl or -sulfonyl and 2-methyl- or ethylsulfonyl-benzothiazol-5- or 6-sulfonyl or -carbonyl, and those corresponding to the 2-sulfonylbenzothiazol-5- or -6-carbonyl or sulfonyl groups, which have sulfo on the condensed benzene ring, 2-chlorobenzoxazol-5- or 6-carbonyl or -sulfonyl, 2-chlorobenzimidazol-5- or 6-carbonyl or -sulfonyl, 2-chloro-1-methylbenzimidazol-5- or 6-carbonyl or -sulfonyl, 2-chloro-4-methyl-1,3-thiazol-5-carbonyl or -4- or -5-sulfonyl, N-oxide of chloro- or nitro-quinolin-5-carbonyl, and the like.

Examples of the aliphatic fiber reactive group are acryloyl, mono-, di- or tri-chloroacryloyl such as —CO—CH=CHCl, —CO—CCl=CH$_2$, —CO—CCl=CH—CH$_3$, —CO—CCl=CH—COOH and —CO—CH=CCl—COOH, β-chloropropionyl, 3-phenylsulfonylpropionyl, 3-methylsulfonylpropionyl, 2-fluoro-2-chloro-3,3-difluorocyclobutan-1-carbonyl, 2,2,3,3-tetrafluorocyclobutan-1-carbonyl or -sulfonyl, β-(2,2,3,3-tetrafluorocyclobutyl)-allyloxy, α- or β-bromoacryloyl, α- or β-alkyl- or allyl-sulfoacryloyl such as α- or β-methylsulfonylacryloyl, chloroacetyl, vinylsulfonyl, —SO$_2$CH$_2$CH$_2$L in which L is as defined above, and the like.

Among the fiber reactive groups described above, preferred are those represented by the following formulas (13) to (17);

 (13)

wherein $X_1$ and $X_2$ independently of one another are each chloro, fluoro,

in which $R_{27}$, $R_{28}$ and $R_{29}$ independently of one another are each unsubstituted or substituted alkyl,

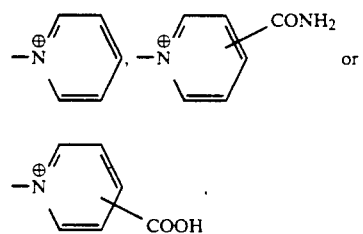

and the asterisked linkage bonds to W or

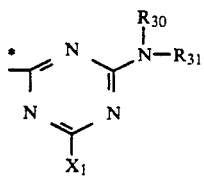 (14)

wherein R$_{30}$ is hydrogen or unsubstituted or substituted alkyl, R$_{31}$ is hydrogen or unsubstituted or substituted alkyl, phenyl or naphthyl, and X$_1$ and the asterisked linkage are as defined above,

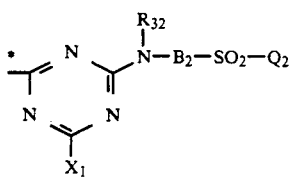 (15)

wherein R$_{32}$ is hydrogen or unsubstituted or substituted alkyl, B$_2$ is phenylene unsubstituted or substituted once or twice by methyl, ethyl, methoxy, ethoxy, chloro, bromo, sulfo, carboxy or nitro, or naphthylene unsubstituted or substituted by sulfo, Q$_2$ is vinyl or —CH$_2$CH$_2$L$_2$ in which L$_2$ is a group capable of being split by the action of an alkali, X$_1$ and the asterisked linkage are as defined above,

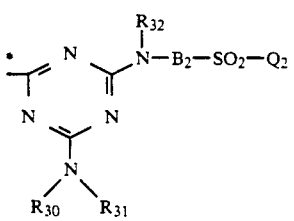 (16)

wherein R$_{30}$, R$_{31}$, R$_{32}$, B$_2$, Q$_2$ and the asterisked linkage are as defined above, and

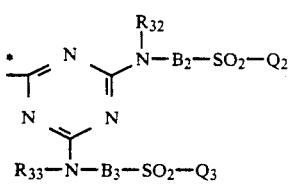 (17)

wherein R$_{33}$ is hydrogen or unsubstituted or substituted alkyl, B$_3$ is phenylene unsubstituted or substituted once or twice by methyl, ethyl, methoxy, ethoxy, chloro, bromo, sulfo, carboxy or nitro, or naphthylene unsubstituted or substituted by sulfo, Q$_3$ is vinyl or —CH$_2$CH$_2$L$_3$ in which L$_3$ is a group capable of being split by the action of an alkali, and R$_{32}$, B$_2$, Q$_2$ and the asterisked linkage are as defined above.

Of these, particularly preferred are the fiber reactive groups represented by the formula (15) wherein X$_1$ is chloro, R$_{32}$ is hydrogen, methyl or ethyl, B$_2$ is phenylene unsubstituted or substituted by methyl or methoxy or β-naphthylene unsubstituted or substituted by sulfo, and Q$_2$ is vinyl or β-sulfatoethyl, the fiber reactive groups represented by the formula (16) wherein R$_{30}$ is hydrogen, methyl or ethyl, R$_{31}$ is phenyl unsubstituted or substituted by sulfo, carboxy, methyl, methoxy or chloro, R$_{32}$ is hydrogen, methyl or ethyl, B$_2$ is phenylene unsubstituted or substituted by methyl or methoxy, or β-naphthylene unsubstituted or substituted by sulfo, Q$_2$ is vinyl or β-sulfatoethyl, and the fiber reactive groups represented by the formula (17) wherein R$_{32}$ and R$_{33}$ independently of one another are each hydrogen, methyl or ethyl, B$_2$ and B$_3$ independently of one another are each phenylene unsubstituted or substituted by methyl or methoxy, or β-naphthylene unsubstituted or substituted by sulfo, and Q$_2$ and Q$_3$ independently of one another are each vinyl or β-sulfatoethyl.

In the present specification, the term "alkyl" is preferably alkyl having 1 to 4 carbon atoms, unless otherwise specified.

The anthraquinone compound represented by the formula (I) may be in the form of a free acid or an alkali metal or alkaline earth metal salt, such as sodium salt, potassium salt and the like.

The present anthraquinone compound (I) can be readily produced in a manner known per se.

For example, respective compounds represented by the following formulas (V), (VI) and (VII),

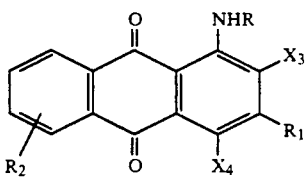 (V)

H—V—A—(W)$_m$—Z (VI)

H—V$_1$—A$_1$—(W$_1$)l$_1$—Z$_1$ (VII)

wherein X$_3$ and X$_4$ independently of one another are each a splittable group such as chloro, bromo, nitro and the like, and R, R$_1$R$_2$, V, V$_1$, A, A$_1$, W, W$_1$, Z, Z$_1$, m and l$_1$ are as defined above, can be used to obtain the anthraquinone compound of the formula (III). More specifically speaking, the compounds (V) and (VII) are subjected a to condensation reaction with each other in a usual manner, followed by a condensation reaction with the compound (VI) in a usual manner, if necessary, further followed by sulfonation using sulfuric acid or oleum.

Moreover, a compound of the following formula (VIII),

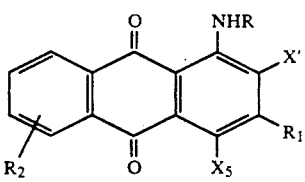 (VIII)

wherein X$_5$ is a splittable group such as chloro, bromo, nitro and the like, and R, R$_1$, R$_2$ and X' are as defined above, and the compound of the above formula (VII) can be used to obtain the anthraquinone compound of the formula (II). That is, the compounds (VII) and (VIII) are subjected a to condensation reaction with each other in a usual manner, if necessary, followed by sulfonation using sulfuric acid or oleum.

In the above production methods, in the case where the fiber reactive groups (Z and Z$_1$) are those capable of being readily formed by converting their precursor group even after completion of the condensation reactions, such as, for example, β-sulfatoethylsulfonyl, it is preferred to use their precursor starting compounds, such as those having β-hydroxyethylsulfonyl. While, in the case where the fiber reactive groups are heterocyclic ones, it is preferred to form the divalent groups (W and $W_1$) after completion of the condensation reactions, so that the fiber reactive groups can be introduced.

Furthermore, cyanuric chloride or fluoride and respective compounds represented by the following formulas (IX), (X) and (XI),

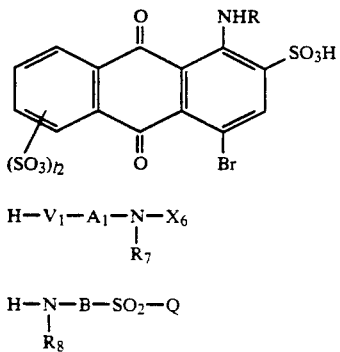

$$H-V_1-A_1-N-X_6 \quad (X)$$
$$\phantom{H-V_1-A_1-N-}R_7$$

$$H-N-B-SO_2-Q \quad (XI)$$
$$\phantom{H-N-}R_8$$

wherein $l_2$ is 0, 1 or 2 and $X_6$ is hydrogen or an amino-protecting group such as acetyl, and R, $R_7$, $R_8$, $A_1$, B, $V_1$ and Q are as defined above, can be used, if necessary together with any one of the compounds represented by the following formulas (XII) to (XV),

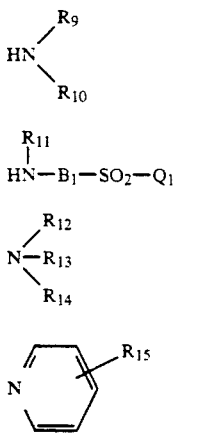

wherein $R_9$, $R_{10}$, $R_{11}$, $R_{12}$, $R_{13}$, $R_{14}$, $R_{15}$, $B_1$ and $Q_1$ are as defined above, to obtain the anthraquinone compound of the formula (IV). That is, the compound (IX) is subjected to Ullmann's condensation reaction with the compound (X), and thereafter the condensate can be subjected to hydrolysis in the presence of an alkali or acid when it has the amino-protecting group such as acetyl as $X_6$, whereby a chromophor compound for the anthraquinone compound of the formula (IV) can be obtained. Successively, the chromophor compound is subjected a to condensation reaction with the compound (XI) and cyanuric chloride or fluoride one after another, if desired, followed by condensation reaction with any one of the compounds (XII) to (XV).

Examples of the compound (V) usable for the production an of anthraquinone compound represented by the formula (III) are 1-amino-2,4-dibromoanthraquinone, 1-amino-2-bromo-4-nitroanthraquinone, 1-amino-2,4-dichloroanthraquinone, 1-amino-2,4-dibromoanthraquinone-5-, 6-, 7- or 8-sulfonic acid and the like.

As to the compounds (VI) and (VII) usable therefor, examples of the groups H—V—A— and H—$V_1$—$A_1$— in the formulas (VI) and (VII), respectively, are hydroxymethyl, hydroxyethyl, 2-hydroxypropyl, 3-hydroxypropyl, 3-hydroxybutyl, 4-hydroxybutyl, 4-hydroxyphentyl, 1,2-dihydroxyethyl, 2-hydroxy-1-sulfoethyl, 2-hydroxy-1-methoxyethyl, 1-carboxy-2-hydroxyethyl, 3- or 4-hydroxycyclohexyl, 3-hydroxy-2- or 4-methylcyclohexyl, 3-hydroxy-5,5-dimethylcyclohexyl, 5-hydroxy-2,4,6- trimethyl-3-sulfophenyl, 5-hydroxy-2-methyl-4-sulfophenyl, 4- or 5-hydroxy-2-sulfophenyl, 4-hydroxy-5-methyl-2-sulfophenyl, 5-hydroxy-2-methyl-3-sulfophenyl, 5-hydroxy-4-methoxy-2-sulfophenyl, 5-hydroxy-2-methoxy-4-sulfophenyl, 4-hydroxy-5-chloro-2-sulfophenyl, 4-hydroxy-5-carboxy-3-sulfophenyl, 4-(2-hydroxyethoxy)-3-sulfophenyl, 4-(2-hydroxyethoxy)-2-methyl-5-sulfophenyl, 4-(2-hydroxyethoxy)-2-methoxy-5-sulfophenyl, 4-(hydroxyethylamino)-2-chloro-5-sulfophenyl, 4-(hydroxyethylamino)-2-carboxy-5-sulfophenyl, 4-(2-hydroxyethylcarbamoyl)-2-sulfophenyl, 5-(2-hydroxypropionylamino)-2-sulfophenyl, 4'-hydroxy-3',2-disulfobiphenyl, 4'-hydroxy-3',3-disulfobiphenyl, 4-[(4'-hydroxy-2'-sulfo)phenylamino]-2-sulfophenyl, 4-[(3'-hydroxy-4'-sulfo)phenylamino]-2-sulfophenyl, 4-[(4'-hydroxy-2'-sulfo)phenylcarbamoyl]-2-sulfophenyl, 4-[(3'-hydroxy-4'-sulfo)phenylcarbamoyl]-2-sulfophenyl, 4-[(4'-hydroxy-3'-sulfo)benzoylamino]-3-sulfophenyl, 5-[(4'-hydroxy-3'-sulfo)benzoylamino]-2-sulfophenyl, their analogues having mercapto in place of hydroxy, and the like.

Examples of the compound (VIII) usable for the production of an anthraquinone compound represented by the formula (II) are 1-amino-2,4-dibromoanthraquinone, 1-amino-2-bromo-4-nitroanthraquinone, 1-cyclohexylamino-4-bromoanthraquinone, 1-benzoylamino-4-bromoanthraquinone, 1-isopropylamino-2-carboxy-4-bromoanthraquinone, 1-cyclohexylamino-4-bromoanthraquinone-5-, 6-, 7- or 8-sulfonic acid and the like.

Examples of the compound [IX] usable for the production of an anthraquinone compound represented by the formula (IV) are 1-amino-4-bromoanthraquinone-2-sulfonic acid, 1-amino-4-bromoanthraquinone-2,6- or 2,7-disulfonic acid, 1-amino-4-bromoanthraquinone-2,5,8-trisulfonic acid, 1-methylamino-4-bromoanthraquinone-2-sulfonic acid, 1-ethylamino-4-bromoanthraquinone-2-sulfonic acid, 1-propylamino-4-bromoanthraquinone-2-sulfonic acid and the like.

Examples of the compound (X) usable therefor are 2,4,6-trimethyl-3-mercapto-5-aminobenzenesulfonic acid, 2-mercapto-4-aminobenzene-1,5-disulfonic acid, 2-mercapto-5-aminobenzene-1,4-disulfonic acid, 5-mercapto-2-amino-4-methoxybenzenesulfonic acid, 1-mercapto-3-aminocyclohexane, 1-mercapto-4-aminocyclohexane, 2- or 4-methyl-1-mercapto-3-aminocyclohexane, 5,5-dimethyl-1-mercapto-3-aminocyclohexane, 1-mercapto-4-N-methyl, -N-ethyl or -N-carboxyethylaminocyclohexane, 4-mercaptomethyl-2-amino-5-methylbenzenesulfonic acid, 4- or 5-mercaptomethyl-2-aminobenzenesulfonic acid, 5-mercaptomethyl-3-amino-2,4-dimethylbenzenesulfonic acid, 6-mercaptomethyl-2-amino-3-methoxybenzenesulfonic acid, 3-mercaptomethyl-2-amino-5-methylbenzenesulfonic acid, 4-mercaptomethyl-2-amino-5-methoxybenzenesulfonic acid, 5-mercaptomethyl-2-aminobenzene-1,4-disulfonic acid, 4-mercaptomethyl-2-amino-5-ethylbenzenesulfonic acid, 1-mercapto-2-aminoethane, 1-mercapto-3-aminopropane, 1-mercapto-4-aminobutane, 1-mercapto-6-aminohexane, 4-mercapto-4'-aminobiphenyl-2,2'-disulfonic acid, 4-mercapto-4'-aminobiphenyl-3'-sulfonic acid, 1-mercapto-3- or 4-aminobenzene, 2-mercapto-4- or 5-aminobenzenesulfonic acid, 1-mercapto-4-N-(β-carboxyethyl)aminobenzene, 4-(β-mercaptoethylamino)aniline, 4-(γ-mercaptopropylamino)aniline, 4-(β-mercaptoethylamino)aniline-2- or 3-sulfonic acid, 4-(β-mercaptoethylamino)aniline-2,5-disulfonic acid, 4-(3'-mercaptophenylamino)aniline, 4-(4'-mercaptophenylamino)aniline, 4-(3'-mercaptophenylamino)aniline-2- or 3-sulfonic acid, 4-(4'-mercaptophenylamino)aniline-2- or 3-sulfonic acid, 4-(3'-mercapto-4'-sulfo)phenylamino aniline, 4-(4'-mercapto-3'-sulfo)phenylamino aniline, 4-(3'-mercapto-4'-sulfo)phenylamino aniline-2- or 3-sulfonic acid, 4-(4'-mercapto-3'-sulfo)phenylamino aniline-2- or 3-sulfonic acid, 4-(4'-mercapto-3'-sulfo)phenylamino aniline-2,5-disulfonic acid, 4-(β-mercaptoethoxy)-aniline-2- or 5-sulfonic acid, 4-(β-mercaptoethoxy)-2-methylaniline-3- or 5-sulfonic acid, 4-(β-mercaptoethylcarbamoyl)aniline-2-sulfonic acid, 5-(β-mercaptopropionylamino)aniline-2- or 4-sulfonic acid, 4-[(4'-mercapto-2'-sulfo)phenylcarbamoyl]aniline-2-sulfonic acid, 4-[(3'-mercapto-4'-sulfo)phenylcarbamoyl]aniline-2-sulfonic acid, 4-[(4'-mercapto-3'-sulfo)benzoylamino]aniline-2- or 5-sulfonic acid, their analogues having hydroxy in place of mercapto, and the like.

After completion of the reaction, the desired anthraquinone compound-containing reaction mixture may be formed in to a liquid commercial product, if desired, after removing any inorganic salts and with the addition of a stabilizer or a dyeing improver. The liquid product obtained or the aforesaid reaction mixture may be subjected to an evaporation such as spray-drying, thereby obtaining a pulverulent commercial product. Alternatively, according to a conventional manner, the reaction mixture may be formed into either a liquid or pulverulent commercial product through salting-out using an electrolyte.

The anthraquinone compound (I) of the present invention is fiber-reactive and is useful for dyeing or printing hydroxyl group-containing and amide group-containing materials, preferably in a fibrous form or a mixed fibrous form.

The hydroxyl group-containing materials include natural or synthetic hydroxyl group-containing materials such as cellulose fiber materials, regenerated products thereof and polyvinyl alcohol. Examples of the cellulose fibers materials are cotton and other vegetable fiber such as linen, hemp, jute and ramie fibers. Examples of the regenerated cellulose fibers are viscose staple and filament viscose.

The amide group-containing materials include synthetic or natural polyamide and polyurethane. Examples of the materials, particularly in fibrous forms, are wool and other animal furs, silk, leather, polyamide-6,6, polyamide-6, polyamide-11 and polyamide-4.

The dyeing can be carried out in any manner suitable for the reactivity of the fiber reactive dye.

For example, cellulose fiber materials can be dyed using the anthraquinone compound of the present invention together with an acid binding agent such as sodium hydroxide, sodium carbonate, phosphates, silicates and sodium hydrogencarbonate in a manner which can be selected from those depending on the property of fibers and physical shape thereof. Examples of the manner applicable are exhaustion dyeing, printing, cold pad batch-up and other methods.

The exhaustion dyeing can be carried out at a relatively low temperature in the presence of an acid binding agent such as sodium carbonate, trisodium phosphate, sodium hydroxide and the like as well as a neutral salt such as sodium sulfate, sodium chloride and the like.

The printing can be carried out by printing the fiber materials with a printing paste containing a paste or emulsified paste such as sodium alginate, starch ether and the like, and an alkali agent such as sodium carbonate, sodium hydrogencarbonate, trisodium phosphate, sodium trichloroacetate and other alkaline or alkali-liberating agents such as potassium or alkaline earth metal salts corresponding to the above, if desired together with a conventional printing auxiliary agent such as urea or a dispersing agent, followed by drying and heat-treating, particularly in the presence of steam.

The cold pad batch-up dyeing can be carried out by padding the fiber materials with a padding liquor at ambient temperature, batching up and allowing the padded fiber materials to stand on a roller for 3 hours or more or over-night, followed by washing with water and drying. The padding liquor can be prepared in a conventional manner using an acid binding agent such as sodium hydroxide alone or a mixture of sodium hydroxide with sodium silicate, sodium carbonate or trisodium phosphate, and if desired, sodium sulfate or sodium chloride optionally together with a dissolution auxiliary agent such as urea and a penetrant.

The dyeing of natural or synthetic polyamide and polyurethane fiber materials can be carried out by performing exhaustion in an acid or weak acid bath, while controlling the pH value, and then making the bath neutral, or in some cases alkaline, to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalene-sulfonic acid, or an addition product between stearylamine and ethylene oxide, and the like.

The present anthraquinone compound can be characterized by superior dye performance in the dyeing and printing of fiber materials, particularly cellulose fiber materials. For example, the present anthraquinone compound can exhibit high exhaustion and fixation percentages and superior build-up properties as well as superior level-dyeing and washing-off properties and high robustness so that a shade to be obtained is hardly affected by some changes in dyebath conditions such as dyeing temperatures, bath ratios, salt concentrations and the like.

Moreover, the dyed or printed products are excellent in fastness properties such as light fastness, perspiration-light fastness, perspiration fastness, acid-hydrolysis fastness, washing fastness, chlorine fastness and the like.

The present invention is illustrated in more detail with reference to the following Examples, which are only illustrative, but not limitative of the scope of the present invention. In Examples, parts are by weight.

EXAMPLE 1

1-Amino-2-(3'-amino-4'-sulfophenoxy)-4-(4'-sulfophenylthio)anthraquinone (6 parts) and cyanuric chloride (1.8 parts) were subjected to condensation reaction in an aqueous medium in a conventional manner, followed by a condensation reaction with 1-aminobenzene-3-β-sulfatoethylsulfone (2.8 parts) at 20° to 40° C. under weak acid conditions. Thereafter, salting out of the reaction mixture with sodium chloride gave an anthraquinone compound of the following formula (free acid form).

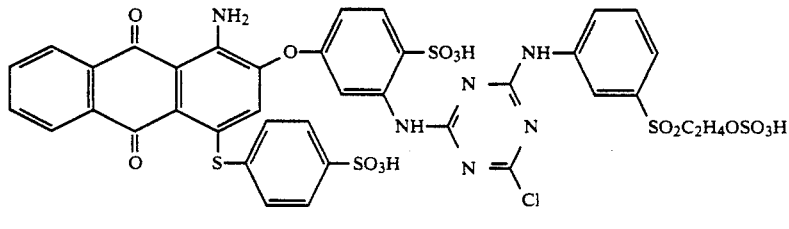

λmax 520 nm

Using the anthraquinone compound, cellulose fiber materials such as cotton can be dyed by the dyeing methods described hereinabove, for example, an exhaustion dyeing method to obtain a dyed product in a bluish red color excellent in light fastness, perspiration-light fastness, perspiration fastness and others with high exhaustion and fixation percentages and superior build-up properties.

Moreover, the anthraquinone compound can exhibit characteristics of high robustness so that the dyeing properties are hardly affected by some changes in dyebath conditions such as dyeing temperatures, bath ratios, salt concentrations and the like.

EXAMPLE 2

Example 1 was repeated, except that the compounds shown in 1st, 2nd and 3rd column of the following table were used in place of the 1-amino-2-(3'-amino-4'-sulfophenoxy)-4-(4'-sulfophenylthio)anthraquinone, cyanuric chloride and 1-aminobenzene-3-β-sulfatoethylsulfone, respectively, thereby obtaining a corresponding anthraquinone compound. A color shade obtained by dyeing cotton with the compound is as shown in a 4th column of the table.

TABLE

| Run No. | 1st | 2nd | 3rd | 4th |
|---|---|---|---|---|
| 1 | Anthraquinone derivative with NH₂, SO₃H, O-phenyl-SO₃H, S-phenyl-SO₃H groups | Cyanuric chloride (2,4,6-trichloro-1,3,5-triazine) | 4-aminophenyl-SO₂CH=CH₂ | Bluish red |
| 2 | " | " | 2-amino-4-(SO₂C₂H₄OSO₃H)-benzenesulfonic acid | " |
| 3 | " | " | 4-amino-phenyl-SO₂C₂H₄OSO₃H | " |
| 4 | " | " | 3-amino-phenyl-SO₂CH=CH₂ | " |
| 5 | Same anthraquinone derivative as Run 1 | Cyanuric chloride | 3-(N-ethylamino)-phenyl-SO₂C₂H₄OSO₃H | Bluish red |

TABLE-continued

| Run No. | 1st | 2nd | 3rd | 4th |
|---|---|---|---|---|
| 6 | [anthraquinone structure with NH₂, O-phenyl-NH₂/SO₃H, S-phenyl-SO₃H substituents] | " | [phenyl with C₂H₅-NH- and SO₂C₂H₄OSO₃H (para)] | " |
| 7 | " | " | [phenyl with C₂H₅-NH- and SO₂C₂H₄OSO₃H (meta)] | " |
| 8 | " | " | [naphthalene with H₂N, SO₃H, SO₂C₂H₄OSO₃H] | " |
| 9 | [anthraquinone structure with NH₂, O-phenyl-NH₂/SO₃H, S-phenyl-SO₃H substituents] | [cyanuric chloride structure] | [naphthalene with H₂N, SO₃H, SO₂C₂H₄OSO₃H] | Bluish red |
| 10 | " | " | [naphthalene with H₂N, SO₃H, SO₂C₂H₄OSO₃H] | " |

TABLE-continued

| Run No. | 1st | 2nd | 3rd | 4th |
|---|---|---|---|---|
| 11 | 1-amino-2-(4-sulfophenoxy)-4-(4-amino-3-sulfophenylthio)anthraquinone | " | 2-amino-4-(β-sulfatoethylsulfonyl)benzoic acid | " |
| 12 | " | cyanuric chloride (2,4,6-trichloro-1,3,5-triazine) | 6-amino-2-(β-sulfatoethylsulfonyl)naphthalene | " |
| 13 | 1-methylamino-2-(3-amino-4-sulfophenoxy)-4-(4-sulfophenylthio)anthraquinone | " | 2-amino-4-methoxy-5-(β-sulfatoethylsulfonyl)benzene | Bluish red |
| 14 | 1-acetylamino-2-(3-amino-4-sulfophenoxy)-4-(4-sulfophenylthio)anthraquinone | " | 2-amino-4-methoxy-5-methyl-6-(β-sulfatoethylsulfonyl)benzene (approx.) | Red |

TABLE-continued

| Run No. | 1st | 2nd | 3rd | 4th |
|---|---|---|---|---|
| 15 | anthraquinone with NHSO₂CH₃, O-(phenyl-SO₃H/NH₂), S-(phenyl-SO₃H) substituents | " | 4-aminophenyl-SO₂C₂H₄OSO₃H (H₂N-) | " |
| 16 | anthraquinone with NH-(phenyl-SO₃H/OC₂H₅), S-(phenyl-NH₂/SO₃H) substituents | " | 4-(N-ethylamino)phenyl-SO₂C₂H₄OSO₃H | Bluish red |
| 17 | anthraquinone with NHCO-(phenyl), OC₂H₄OSO₃H, S-(phenyl-NH₂/SO₃H) substituents | cyanuric chloride (2,4,6-trichlorotriazine) | 4-aminophenyl-SO₂C₂H₄OSO₃H (H₂N-) | Red |

TABLE-continued

| Run No. | 1st | 2nd | 3rd | 4th |
|---|---|---|---|---|
| 18 | anthraquinone with NHSO2-C6H4-CH3, OCH(CH3)2, S-C6H3(NH2)(SO3H) substituents | " | 3-CH3-NH-C6H4-SO2C2H4OSO3H | " |
| 19 | anthraquinone with NH2, O-cyclohexyl, S-C6H3(NH2)(SO3H), SO3H substituents | " | 4-H2N-C6H4-SO2CH2CH2Cl | Bluish red |
| 20 | anthraquinone with NH2, O-(3-methylcyclohexyl), S-C6H3(SO3H)(NH2), SO3H substituents | " | 2-Cl-4-H2N-C6H3-SO2C2H4OSO3H | " |

TABLE-continued

| Run No. | 1st | 2nd | 3rd | 4th |
|---|---|---|---|---|
| 21 | anthraquinone structure with NH₂, O-cyclohexyl-C(CH₃)₂, S-phenyl(SO₃H)(NH₂), SO₃H | cyanuric chloride (2,4,6-trichloro-1,3,5-triazine) | phenyl with HN-C₂H₄OH and SO₂C₂H₄OSO₃H | Bluish red |
| 22 | anthraquinone with NH₂, OC₂H₄COOH, S-phenyl(NH₂)(SO₃H), SO₃H | " | phenyl with HN-C₂H₄COOH and SO₂C₂H₄OSO₃H | " |
| 23 | anthraquinone with NH₂, OC₂H₄O-phenyl(SO₃H), S-phenyl(NH₂)(SO₃H), SO₃H | " | phenyl with H₂N and SO₂C₂H₄OSO₃H | " |

TABLE-continued

| Run No. | 1st | 2nd | 3rd | 4th |
|---|---|---|---|---|
| 24 | anthraquinone with NH₂, SO₃H, O-phenyl-SO₃H, S-phenyl-SO₃H substituents (with additional SO₃H) | " | " | " |
| 25 | anthraquinone with NH₂, SO₃H, O-phenyl-SO₃H, S-phenyl(SO₃H, NH₂) substituents | cyanuric chloride (2,4,6-trichloro-1,3,5-triazine) | 3-aminophenyl-SO₂C₂H₄OSO₃H | Bluish red |
| 26 | anthraquinone with NH₂, SO₃H, O-phenyl(SO₃H, NH₂), SCH₃ substituents | " | " | " |
| 27 | anthraquinone with NH₂, SO₃H, O-phenyl(SO₃H, NH₂), SC₂H₅ substituents | " | 4-aminophenyl-SO₂C₂H₄OSO₃H | " |

TABLE-continued

| Run No. | 1st | 2nd | 3rd | 4th |
|---|---|---|---|---|
| 28 | 1-amino-2-(4-amino-2-sulfophenoxy)-4-(2-sulfatoethylthio)anthraquinone | " | 2-amino-5-(2-sulfatoethylsulfonyl)anisole | " |
| 29 | 1-amino-2-(2-amino-4-sulfophenoxy)-4-(2-sulfatoethylthio)anthraquinone | cyanuric chloride | 2-amino-5-(2-sulfatoethylsulfonyl)anisole | Bluish red |
| 30 | 1-amino-2-(4-amino-2-sulfophenoxy)-4-(2-carboxyethylthio)anthraquinone | " | 3-(2-cyanoethylamino)phenyl 2-sulfatoethyl sulfone | " |
| 31 | 1-amino-2-(4-amino-2-sulfophenoxy)-4-(cyclohexylthio)anthraquinone | cyanuric chloride | 3-(ethylamino)phenyl 2-sulfatoethyl sulfone | " |

TABLE-continued

| Run No. | 1st | 2nd | 3rd | 4th |
|---|---|---|---|---|
| 32 | aminoanthraquinone with phenoxy-SO3H-NH2 and S-CH2-C6H4-SO3H substituents | " | phenyl with HN-C2H4CONH2 and SO2C2H4OSO3H | " |
| 33 | aminoanthraquinone with phenoxy-SO3H and SC2H4NH2 substituents | cyanuric chloride (triazine with N, Cl, Cl) | phenyl with H2N and SO2C2H4OSO3H | Bluish red |
| 34 | aminoanthraquinone with phenoxy-SO3H (2,4-di) and S-C3H6-NH2 substituents | " | | " |
| 35 | aminoanthraquinone with biphenyl-NH2,SO3H,SO3H-oxy and S-cyclohexyl substituents | " | | " |

TABLE-continued

| Run No. | 1st | 2nd | 3rd | 4th |
|---|---|---|---|---|
| 36 | anthraquinone with NH₂, SO₃H, O-biphenyl(SO₃H,NH₂), S-CH(CH₃)₂ substituents | cyanuric chloride (N₃C₃Cl₂) | | " |
| 37 | anthraquinone with NH₂, O-phenyl(SO₃H)-NH-phenyl(SO₃H,NH₂), S-CH₂COOH substituents | cyanuric chloride (N₃C₃Cl₂) | H₂N-C₆H₄-SO₂C₂H₄OSO₃H | Bluish red |
| 38 | anthraquinone with NH₂, O-cyclohexyl, S-phenyl(SO₃H)-NH-phenyl(SO₃H,NH₂) substituents | " | 2-OCH₃, 4-CH₃, 5-SO₂C₂H₄OSO₃H aniline | " |
| 39 | anthraquinone with NH₂, O-(3-methylcyclohexyl), SO₃H, S-phenyl(SO₃H,NH₂) substituents | " | C₂H₅-NH-C₆H₄-SO₂C₂H₄OSO₃H | " |

TABLE-continued

| Run No. | 1st | 2nd | 3rd | 4th |
|---|---|---|---|---|
| 40 | Anthraquinone with NHCH(CH₃)₂, OC₂H₅, SO₃H, S-phenyl(SO₃H, NH₂) substituents | " | " | Red |
| 41 | Anthraquinone with NHC₂H₄OCH₃, OC₂H₄OSO₃H, S-phenyl(NH₂, SO₃H) substituents | Cyanuric chloride (trichlorotriazine) | 3-aminophenyl-SO₂C₂H₄OSO₃H | Bluish red |
| 42 | Anthraquinone with NHC₂H₄COOH, OC₂H₅, SO₃H, S-phenyl(SO₃H, NH₂) substituents | " | " | " |

TABLE-continued

| Run No. | 1st | 2nd | 3rd | 4th |
|---|---|---|---|---|
| 43 | anthraquinone with NHC₂H₄OSO₃H, OC₂H₄COOH, S-phenyl(SO₃H, NH₂) | " | aniline-SO₂C₂H₄OSO₃H (H₂N–C₆H₄–SO₂C₂H₄OSO₃H) | " |
| 44 | anthraquinone with NH-cyclohexyl, OCH₃, S-phenyl(SO₃H, NH₂) | cyanuric chloride (2,4,6-trichlorotriazine) | aniline-SO₂C₂H₄OSO₃H | Red |
| 45 | anthraquinone with NHC₂H₅, OCH(CH₃)₂, S-phenyl(NH₂, SO₃H) | " | " | Bluish red |

EXAMPLE 3

1-Amino-2-(3'-amino-4'-sulfophenoxy)-4-(4'-sulfophenylthio)anthraquinone (6 parts), cyanuric chloride (1.8 parts) and 1-aminobenzene-4-β-sulfatoethylsulfone (2.8 parts) were subjected to condensation reactions one after another in an aqueous medium in a conventional manner, followed by a successive condensation reaction with 3-aminobenzenesulfonic acid (1.7 parts) at 50° to 70° C. under a weak acid condition. Thereafter, salting out of the reaction mixture gave an anthraquinone compound of following formula (free acid form).

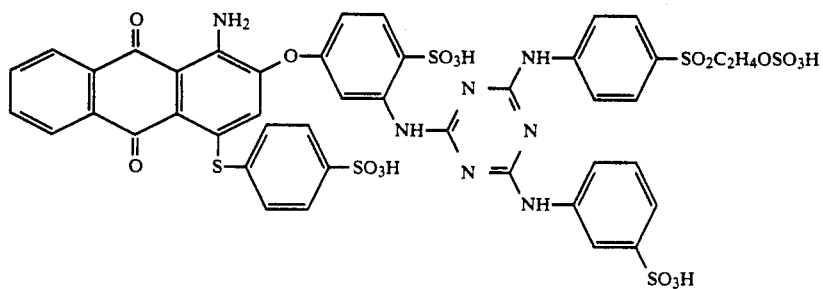

λmax 520 nm

The anthraquinone compound can be used for dyeing cotton to give a dyed product of a bluish red color excellent in light fastness, perspiration-light fastness, perspiration fastness and the like with high exhaustion and fixation percentages and superior build-up properties.

Moreover, the anthraquinone compound can be characterized by high robustness so that the dyeing properties are hardly affected even by some changes in dyeing conditions such as temperatures, bath ratios, salt concentrations and the like.

EXAMPLE 4

Example 3 was repeated, except that the compounds shown in 1st, 2nd and 3rd columns of the following table were used in place of the 1-amino-2-(3'-amino-4'-sulfophenoxy)-4-(4'-sulfophenylthio)anthraquinone, 1-aminobenzene-4-β-sulfatoethylsulfone and 3-aminobenzenesulfonic acid respectively, thereby obtaining a corresponding anthraquinone. The color shade obtained by dyeing cotton with the anthraquinone compound is as shown in a 4th column of the table. Each compound can exhibit superior dye performances as described hereinabove.

TABLE

| Run No. | 1st | 2nd | 3rd | 4th |
|---|---|---|---|---|
| 1 | anthrapyridone chromophore with SO₃H, NH₂, O-phenyl-SO₃H, S-phenyl substituents | 3-H₂N-C₆H₄-SO₂C₂H₄—OSO₃H | 4-H₂N-C₆H₄-SO₃H | Bluish red |
| 2 | ″ | C₆H₅-NH-C₂H₅ | 3-H₂N-C₆H₄-SO₂C₂H₄OSO₃H | ″ |
| 3 | ″ | 4-Cl-C₆H₄-N(C₂H₅)H | ″ | ″ |
| 4 | ″ | 4-H₂N-C₆H₄-SO₂C₂H₄—OSO₃H | C₆H₅-NH₂ | ″ |
| 5 | same anthrapyridone chromophore | 4-H₂N-C₆H₄-SO₂C₂H₄—OSO₃H | 4-H₂N-C₆H₄-SO₃H | Bluish red |
| 6 | ″ | 3-H₂N-C₆H₄-SO₂C₂H₄—OSO₃H | 3-H₂N-C₆H₄-SO₃H | ″ |

TABLE-continued

| Run No. | 1st | 2nd | 3rd | 4th |
|---|---|---|---|---|
| 7 | " | " | 4-Cl-C6H4-NH2 | " |
| 8 | " | " | H2NC2H5 | " |
| 9 | anthraquinone structure with NH2, SO3H, O-phenyl-SO3H, S-phenyl-SO3H | SO2C2H4—OSO3H on 3-aminophenyl | 3-CH3-C6H4-NH2 | Bluish red |
| 10 | " | " | 4-HOOC-C6H4-NH2 | " |
| 11 | anthraquinone structure with NH2, SO3H, O-phenyl, S-phenyl-NH2-SO3H | SO2C2H4—OSO3H on 4-aminophenyl | SO2C2H4—OSO3H on 3-aminophenyl | " |
| 12 | " | " | SO2C2H4—OSO3H on 4-aminophenyl | " |

TABLE-continued

| Run No. | 1st | 2nd | 3rd | 4th |
|---|---|---|---|---|
| 13 | anthraquinone structure with SO₃H, NH₂, O-phenyl-SO₃H, S-phenyl(SO₃H)(NH₂) | 3-(C₂H₅NH)-phenyl-SO₂C₂H₄—OSO₃H | 3-H₂N-phenyl-SO₂C₂H₄—OSO₃H | Bluish red |
| 14 | anthraquinone structure | 4-(C₂H₅NH)-phenyl-SO₂C₂H₄—OSO₃H | 4-OCH₃-3-H₂N-phenyl-SO₃C₂H₄—OSO₃H | " |
| 15 | " | 2-OCH₃-4-CH₃-5-H₂N-phenyl-SO₂C₂H₄—OSO₃H | 3-H₂N-phenyl-SO₂C₂H₄—OSO₃H | " |
| 16 | " | C₆H₅—N(CH₃)H | " | " |
| 17 | anthraquinone structure | 2-Cl-phenyl-NH₂ | 3-H₂N-phenyl-SO₂C₂H₄—OSO₃H | Bluish red |

TABLE-continued

| Run No. | 1st | 2nd | 3rd | 4th |
|---|---|---|---|---|
| 18 | 1-amino-4-(isopropylthio)-2-(2-amino-4-sulfophenoxy)anthraquinone-6-sulfonic acid | N-ethylaniline (HN-C₂H₅ on phenyl) | " | " |
| 19 | 1-amino-4-(cyclohexylthio)-2-(2-amino-4-sulfophenoxy)anthraquinone | 3-aminophenyl-SO₂C₂H₄-OSO₃H | 5-amino-1,3-benzenedisulfonic acid | " |
| 20 | 1-amino-4-(cyclohexylthio)-2-cyclohexyloxy-anthraquinone | " | " | " |
| 21 | 1-amino-4-(4-sulfophenylthio)-2-(2-amino-4-sulfophenoxy)anthraquinone | 3-aminophenyl-SO₂C₂H₄-OSO₃H | H₂N—C₂H₄OH | Bluish red |
| 22 | " | " | H₂N—C₂H₄SO₃H | " |
| 23 | " | 4-aminophenyl-SO₂C₂H₄-OSO₃H | HN(C₂H₅)₂ | " |

TABLE-continued

| Run No. | 1st | 2nd | 3rd | 4th |
|---|---|---|---|---|
| 24 | [anthraquinone structure with NH₂, O-C₆H₄-SO₃H, S-C₆H₃(NH₂)(SO₃H) substituents] | " | HN(C₂H₄OH)(C₂H₄OH) | " |
| 25 | " | " | HN(C₂H₄OCH₃)(C₂H₅) | " |

EXAMPLE 5

1-Amino-2-(3'-amino-4'-sulfophenoxy)-4-(4'-sulfophenylthio)anthraquinone (6 parts) and cyanuric chloride (1.8 parts) were subjected a to condensation reaction at 5° to 30° C. under a weak acid condition in an aqueous medium, and then salting out of the reaction mixture gave an anthraquinone compound of the following formula (free acid form).

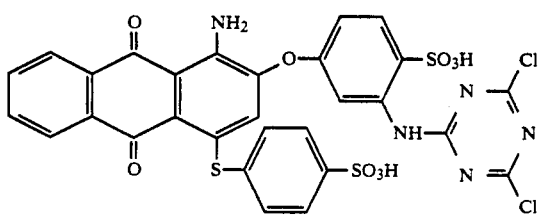

λmax 520 nm

The above compound can be used for dyeing cotton to give a dyed product of a bluish red color excellent in fastness properties such as light fastness, perspiration-light fastness, perspiration fastness and the like with high exhausation and fixation percentages and superior build-up properties.

EXAMPLE 6

Example 5 was repeated, except that the compounds shown in 1st and 2nd columns of the following table were used in place of the 1-amino-2-(3'-amino-4'-sulfophenoxy)-4-(4-sulfophenylthio)anthraquinone and cyanuric chloride, respectively, thereby obtaining a corresponding anthraquinone compound. The color shade obtained by dyeing cotton with the compound is as shown in a 3rd column of the table. Each compound can exhibit superior dye performances as described hereinabove.

TABLE

| Run No. | 1st | 2nd | 3rd |
|---|---|---|---|
| 1 | (anthraquinone structure) | (triazine with Cl) | Bluish red |
| 2 | (anthraquinone structure) | (pyrimidine with Cl, SO2CH3, CH3) | " |
| 3 | " | (pyrimidine with F, Cl) | " |
| 4 | " | (pyrimidine with F, Cl, CH3) | " |
| 5 | (anthraquinone structure) | (pyrimidine with Cl) | Bluish red |

TABLE-continued

| Run No. | 1st | 2nd | 3rd |
|---|---|---|---|
| 6 | 1-amino-4-(4-amino-3-sulfophenylthio)-2-(4-sulfophenoxy)anthraquinone structure | dichloro-cyanovinyl triazine structure | " |
| 7 | " | cyanuric chloride structure | " |
| 8 | 1-amino-2-(3-amino-4-sulfophenoxy)-4-(β-sulfatoethylthio)anthraquinone structure | " | " |
| 9 | 1-amino-2-(3-amino-4-sulfophenoxy)-4-(β-sulfatoethylthio)anthraquinone structure | 2,4-difluoro-5-chloropyrimidine structure | Bluish red |
| 10 | 1-(carboxymethylamino)-2-(β-sulfatoethoxy)-4-(4-amino-3-sulfophenylthio)anthraquinone structure | " | " |

EXAMPLE 7

1-Amino-2-bromo-4-phenylthioanthraquinone (4.1 parts) and 3-β-hydroxyethylsulfonylphenol (2.1 parts) were allowed to react with each other at 100° to 120° C. in dimethylformamide in the presence of potassium carbonate. After completion of the reaction, methanol was added to the reaction mixture to deposit crystals, which were then collected on a filter, well washed with water and then dried at 80° C. The product obtained was subjected to both sulfonation and esterification at 20° to 40° C. in 10% oleum. Ice was added to the reaction mixture to deposit crystals, which were then collected on a filter to obtain an anthraquinone compound of the following formula (free acid form).

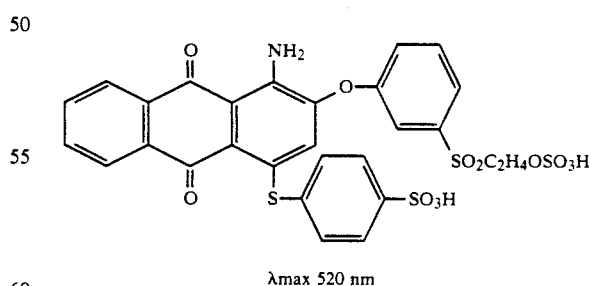

λmax 520 nm

The above compound can be used for dyeing cotton to obtain a dyed product of a bluish red excellent in fastness properties such as light fastness, perspiration-light fastness, perspiration fastness and the like with high exhaustion and fixation percentages and superior build-up properties.

EXAMPLE 8

Example 7 was repeated, except that the compounds shown in 1st and 2nd columns of the following table were used in place of the 1-amino-2-bromo-4-phenylthioanthraquinone and 3-β-hydroxyethylsulfonylphenol, respectively, thereby obtaining a corresponding anthraquinone compound. The color shade obtained by dyeing cotton with the compound is as shown in a 3rd column of the above. Each compound can exhibit superior dye performances as described hereinabove.

TABLE

| Run No. | 1st | 2nd | 3rd |
|---|---|---|---|
| 1 | 1-amino-2-bromo-4-phenylthioanthraquinone | HO—C₆H₄—SO₂C₂H₄OH | Bluish red |
| 2 | " | 2-methoxy-5-hydroxyphenyl-SO₂C₂H₄OH | " |
| 3 | " | 4-hydroxy-2-methoxyphenyl-SO₂C₂H₄OH (HO—, —OCH₃, —SO₂C₂H₄OH) | " |
| 4 | " | (OCH₃, HO, CH₃, SO₂C₂H₄OH substituted phenyl) | " |
| 5 | 1-amino-2-bromo-4-phenylthioanthraquinone | HO—C₆H₄—O—C₆H₄—SO₂C₂H₄OH | Bluish red |
| 6 | " | HO—C₆H₄—CONH—C₆H₄—SO₂C₂H₄OH | " |
| 7 | " | HO—, SO₃H substituted C₆H₃—NH—C₆H₄—SO₂C₂H₄OH | " |
| 8 | " | HO—, SO₃H substituted C₆H₃—NHCO—C₆H₄—SO₂C₂H₄OH | " |

TABLE-continued

| Run No. | 1st | 2nd | 3rd |
|---|---|---|---|
| 9 | 1-amino-2-chloro-4-phenylthio anthraquinone with NHCH(CH₃)₂ | HOC₂H₄O—C₆H₄—SO₂C₂H₄OH (meta) | " |
| 10 | 1-amino-2-bromo-4-phenylthio anthraquinone with NH₂ | HO—C₆H₄—SO₂C₂H₄OH (meta) | Bluish red |

EXAMPLE 9

1-Amino-2-bromo-4-(3'-β-hydroxyethylsulfonylphenylthio)anthraquinone (5.2 parts) and phenol (9.5 parts) were allowed to react with each other at 100° to 120° C. in dimethylformamide in the presence of potassium carbonate. After completion of the reaction, methanol was added thereto to deposit crystals, which were collected on a filter, well washed with water and then dried at 80° C. The product obtained was subjected to both sulfonation and esterification at 20° to 40° C. in 10% oleum. Thereafter, ice was added to the reaction mixture to deposit crystals, which were collected on a filter to obtain an anthraquinone compound of the following formula (free acid form).

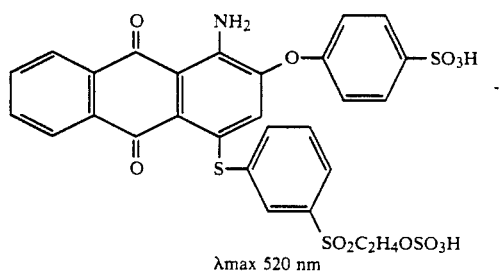

λmax 520 nm

The compound obtained can be used for dyeing cotton to obtain a dyed product of a bluish red color excellent in fastness properties such as light fastness, perspiration-light fastness, perspiration fastness and the like with high exhaustion and fixation percentages and superior build-up properties.

EXAMPLE 10

Example 9 was repeated, except that the compounds shown in 1st and 2nd columns of the following above was used in place of the 1-amino-2-bromo-4-(3'-β-hydroxyethylsulfonylphenolthio)anthraquinone and phenol, respectively, thereby obtaining a corresponding anthraquinone compound. The color shade obtained by dyeing cotton with the compound is as shown in 3rd column of the table. Each compound can exhibit superior dye performances as described hereinabove.

TABLE

| Run No. | 1st | 2nd | 3rd |
|---|---|---|---|
| 1 | 1-amino-2-bromo-4-(phenylthio-SO₂C₂H₄OH)anthraquinone | HO—C₆H₄—CH₃ (para) | Bluish red |
| 2 | " | HO—C₆H₄—O—C₆H₅ (para) | " |

TABLE-continued

| Run No. | 1st | 2nd | 3rd |
|---|---|---|---|
| 3 | " | HO—C₆H₄—OCH₃ (3-methoxyphenol) | " |
| 4 | 1-amino-2-bromo-4-(4-(2-hydroxyethylsulfonyl)phenylthio)anthraquinone | HO—C₆H₅ (phenol) | " |
| 5 | 1-amino-2-bromo-4-(4-(2-hydroxyethylsulfonyl)phenylthio)anthraquinone | HO—C₆H₄—NH—C₆H₅ (4-hydroxydiphenylamine) | Bluish red |
| 6 | 1-cyclohexylamino-2-bromo-4-[4-(4-(2-hydroxyethylsulfonyl)phenylamino)phenylthio]anthraquinone | HOC₂H₄O—C₆H₅ (2-phenoxyethanol) | " |
| 7 | 1-(2-hydroxyethylamino)-2-chloro-4-(4-(2-hydroxyethylsulfonyl)phenylthio)anthraquinone | " | " |
| 8 | 1-amino-2-chloro-4-(4-(2-hydroxyethylsulfonyl)phenylthio)anthraquinone | HO—C₆H₄—Cl (3-chlorophenol) | " |
| 9 | 1-amino-2-chloro-4-(4-(2-hydroxyethylsulfonyl)phenylthio)anthraquinone | HS—C₆H₅ (thiophenol) | Bluish red |

| Run No. | 1st | 2nd | 3rd |
|---|---|---|---|
| 10 | 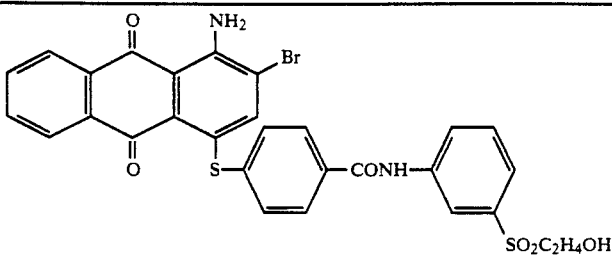 | 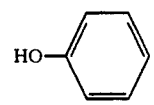 | " |

EXAMPLE 11

1-Amino-2-(3'-amino-4'-sulfophenoxy)-4-(4'-sulfophenylthio)anthraquinone (6 parts) and cyanuric chloride (1.8 parts) were subjected a to condensation reaction in an aqueous medium in a conventional manner, followed by a condensation reaction with 3-aminobenzenesulfonic acid (1.7 parts) at 20° to 40° C. under a weak acid condition. Thereafter, salting out of the reaction mixture with sodium chloride gave an anthraquinone compound of the following formula (free acid form).

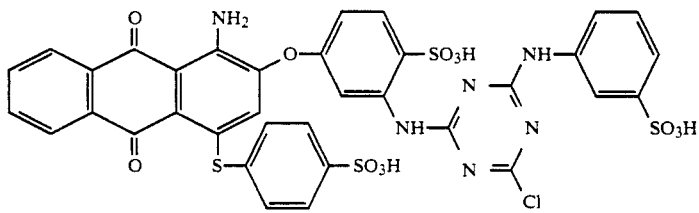

λmax 520 nm

The anthraquinone compound can be used for dyeing fiber materials, particularly those such as cotton in the manner as described hereinabove, such as, for example, by the exhaustion dyeing method, to obtain a dyed product of a bluish red color excellent in fastness properties such as light fastness, perspiration-light fastness, perspiration fastness and the like with high exhaustion and fixation percentages and superior build-up properties.

EXAMPLE 12

Example 11 was repeated, except that the compounds shown in 1st, 2nd and 3rd columns of the following table were used in place of the 1-amino-2-(3'-amino-4'-sulfophenoxy)-4-(4'-sulfophenylthio)anthraquinone, cyanuric chloride and 3-aminobenzenesulfonic acid, respectively, thereby obtaining a corresponding anthraquinone compound. The color shade obtained by dyeing cotton with the compound is as shown in a 4th column of the table.

| Run No. | 1st | 2nd | 3rd | 4th |
|---|---|---|---|---|
| 1 | anthraquinone structure with NH₂, SO₃H, NH₂, O, S-C₆H₄-SO₃H | cyanuric chloride (2,4,6-trichloro-1,3,5-triazine) | 2,5-disulfo-aniline (H₂N, SO₃H, SO₃H on benzene) | Bluish red |
| 2 | " | 2,4,6-trifluoro-1,3,5-triazine | 2-amino-benzene-1,4-disulfonic acid type (HO₃S, SO₃H, H₂N) | " |
| 3 | " | cyanuric chloride | sulfanilic acid (H₂N-C₆H₄-SO₃H) | " |
| 4 | " | " | aniline (H₂N-C₆H₅) | " |
| 5 | anthraquinone structure with NH₂, SO₃H, NH₂, O, S-C₆H₄-SO₃H | cyanuric chloride | NH₃ | Bluish red |
| 6 | " | " | H₂N—C₂H₄SO₃H | " |
| 7 | " | " | H₂N—C₂H₄COOH | " |

-continued
| Run No. | 1st | 2nd | 3rd | 4th |
|---|---|---|---|---|
| 8 | " | " | 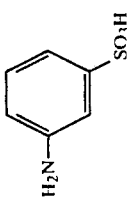 | " |
| 9 | 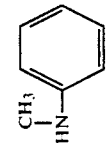 |  | 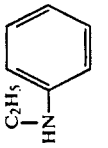 | Bluish red |
| 10 | " | " | 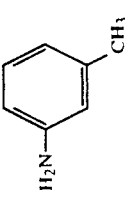 | " |
| 11 | " | " | 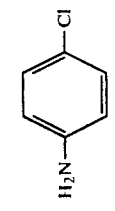 | " |
| 12 | 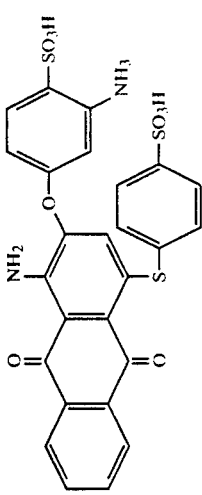 | " | | " |

-continued

| Run No. | 1st | 2nd | 3rd | 4th |
|---|---|---|---|---|
| 13 | anthraquinone derivative with NH2, SO3H, O-phenyl-SO3H, S substituents | 2,4-difluoro-6-? triazine (F,F,F triazine) | 4-aminobenzoic acid (H2N-C6H4-COOH) | Bluish red |
| 14 | " | cyanuric chloride (Cl,Cl,Cl triazine) | 4-chloro-N-ethylaniline (C2H5-NH-C6H4-Cl) | " |
| 15 | " | " | 4-methoxyaniline (H2N-C6H4-OCH3) | " |
| 16 | " | " | 6-amino-2-naphthalenesulfonic acid (H2N-naphthyl-SO3H) | " |
| 17 | same anthraquinone derivative | cyanuric chloride (Cl,Cl,Cl triazine) | H2N—C3H7 | Bluish red |

-continued

| Run No. | 1st | 2nd | 3rd | 4th |
|---|---|---|---|---|
| 18 | anthraquinone with NH₂, O-C₆H₄-SO₃H, SO₃H, S-C₆H₃(NH₂) substituents | " | 6-amino-1-naphthalenesulfonic acid (H₂N-naphthalene-SO₃H) | " |
| 19 | " | cyanuric chloride (2,4,6-trichloro-1,3,5-triazine) | H₂NCH₂-C₆H₅ | " |
| 20 | " | " | 4-ethylaniline (H₂N-C₆H₄-C₂H₅) | " |
| 21 | anthraquinone with NH₂, O-C₆H₃(NH₂)-SO₃H, SO₃H, S-C₆H₄-SO₃H substituents | " | H₂N-C₆H₄-CONHC₂H₄SO₂-C₂H₄Cl | Bluish red |
| 22 | anthraquinone with NH₂, O-C₆H₃(NH₂)-SO₃H, SO₃H, S-C₆H₄-SO₃H substituents | " | " | " |

| Run No. | 1st | 2nd | 3rd | 4th |
|---|---|---|---|---|
| 23 | anthraquinone with NH2, SCH3, and O-phenyl(SO3H, NH2) substituents | trifluorotriazine | 3-aminobenzenesulfonic acid | " |
| 24 | anthraquinone with NH2, SC2H5, and O-phenyl(SO3H, NH2) substituents | trichlorotriazine | 2-aminobenzene-1,4-disulfonic acid | " |
| 25 | anthraquinone with NH2, SC2H4OSO3H, and O-phenyl(SO3H, NH2) substituents | trichlorotriazine | HN(C2H5)2 | Bluish red |
| 26 | anthraquinone with NH2, S-phenyl-SO3H, and O-phenyl(SO3H, NH2) substituents | " | 3-aminobenzenesulfonic acid | Yellowish red |

-continued

| Run No. | 1st | 2nd | 3rd | 4th |
|---|---|---|---|---|
| 27 | anthraquinone with NH$_2$, S-C$_6$H$_4$-SO$_3$H, and O-C$_6$H$_3$(NH$_2$)(SO$_3$H) substituents | " | | " |
| 28 | anthraquinone with NH$_2$, S-C$_6$H$_3$(SO$_3$H)(NH$_2$), and O-cyclohexyl substituents | " | | " |
| 29 | anthraquinone with NH$_2$, S-C$_6$H$_3$(SO$_3$H)(NH$_2$), and OCH(CH$_3$)$_2$ substituents | cyanuric chloride (triazine with 3 Cl) | 2,5-disulfoaniline (H$_2$N-C$_6$H$_3$(SO$_3$H)$_2$) | Yellowish red |
| 30 | anthraquinone with NH$_2$, S-C$_6$H$_3$(SO$_3$H)(NH$_2$), and OC$_2$H$_4$OSO$_3$H substituents | " | 3-aminobenzenesulfonic acid (H$_2$N-C$_6$H$_4$-SO$_3$H) | " |

EXAMPLE 13

1-Amino-2-carboxy-4-(3'-amino-4'-sulfophenylthio)anthraquinone (9.4 parts) and cyanuric chloride (3.7 parts) were subjected a to condensation reaction in an aqueous medium in a usual manner, followed by a condensation reaction with 1-aminobenzene-3-β-sulfatoethylsulfone (5.6 parts) at 20° to 40° C. under a weak acid condition. Thereafter, salting out of the reaction mixture with sodium chloride gave an anthraquinone compound of the following formula (free acid form).

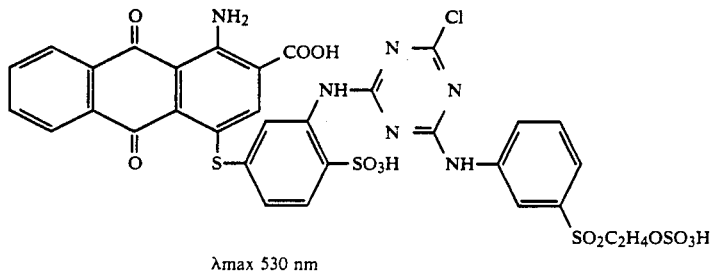

λmax 530 nm

The anthraquinone compound can be used for dyeing cellulose fiber materials, particularly those such as cotton in the manner described for example, by the exhaustion method, to give a dyed product of a bluish red color excellent in fastness properties such as light fastness, perspiration-light fastness, perspiration fastness and the like, with high exhaustion and fixation percentages and superior build up properties.

Moreover, the anthraquinone compound is robust so that the dyeing properties are not be affected by some changes change in dyeing conditions such as temperatures, bath ratios, salt concentrations and the like.

EXAMPLE 14

Example 13 was repeated, except that the compounds described in 1st, 2nd and 3rd columns of the following table were used in place of the 1-amino-2-carboxy-4-(3'-amino-4'-sulfophenylthio)anthraquinone, cyanuric chloride and 1-aminobenzene-3-β-sulfatoethylsulfone, respectively, thereby obtaining a corresponding anthraquinone compound. The color shade obtained by dyeing cotton with the anthraquinone compound is as shown in a 4th column of the table.

TABLE

| Run No. | 1st | 2nd | 3rd | 4th |
|---|---|---|---|---|
| 1 | Anthracene-dione with NHCH(CH$_3$)$_2$, COOH, S-linked aminobenzenesulfonic acid (SO$_3$H, NH$_2$) | Cyanuric chloride (2,4,6-trichloro-1,3,5-triazine) | 4-H$_2$N-C$_6$H$_4$-SO$_2$C$_2$H$_4$OSO$_3$H | Bluish red |
| 2 |  ″ |  ″ | 3-H$_2$N-C$_6$H$_4$-SO$_2$C$_2$H$_4$OSO$_3$H |  ″ |
| 3 |  ″ |  ″ | 3-(C$_2$H$_5$)HN-C$_6$H$_4$-SO$_2$C$_2$H$_4$OSO$_3$H |  ″ |
| 4 | Anthracene-dione with NHC$_2$H$_4$OH, COOH, S-linked aminobenzenesulfonic acid (SO$_3$H, NH$_2$) |  ″ | 3-H$_2$N-C$_6$H$_4$-SO$_2$CH=CH$_2$ |  ″ |

TABLE-continued

| Run No. | 1st | 2nd | 3rd | 4th |
|---|---|---|---|---|
| 5 | anthraquinone with NHC₂H₄OH, COOH, S-phenyl(SO₃H, NH₂) | cyanuric chloride | aniline with NHC₂H₅ and SO₂C₂H₄OSO₃H | Bluish red |
| 6 | anthraquinone with NHC₂H₄COOH, S-phenyl(SO₃H, NH₂) | " | aniline with OCH₃, NH₂ and SO₂C₂H₄OSO₃H | " |
| 7 | anthraquinone with NH-cyclohexyl, S-phenyl(SO₃H, NH₂) | " | aniline with NHC₂H₅ and SO₂C₂H₄OSO₃H | " |

TABLE-continued

| Run No. | 1st | 2nd | 3rd | 4th |
|---|---|---|---|---|
| 8 | (anthraquinone with NH-cyclohexyl and S-biphenyl-disulfonic acid-amino substituents) | cyanuric chloride | 4-amino-2-methoxy-5-methyl-phenyl-SO$_2$C$_2$H$_4$OSO$_3$H | Bluish red |
| 9 | (anthraquinone with NHCH(CH$_3$)$_2$ and S-diphenylamine-disulfonic acid-amino substituents) | " | 3-amino-phenyl-SO$_2$C$_2$H$_4$OSO$_3$H | " |
| 10 | (anthraquinone with NH-(4-sulfophenyl) and S-phenyl-NHCO-aminophenyl-disulfonic acid substituents) | " | " | " |

TABLE-continued

| Run No. | 1st | 2nd | 3rd | 4th |
|---|---|---|---|---|
| 11 | 1-NHCOCH₃, 4-S-(2-amino-4-sulfophenyl)anthraquinone derivative | cyanuric chloride | 3-(C₂H₄OH)NH-phenyl-SO₂C₂H₄OSO₃H | Red |
| 12 | 1-NHCOC₆H₅, 4-S-(2-amino-4-sulfophenyl)anthraquinone derivative | ″ | 3-(CH₃)NH-phenyl-SO₂C₂H₄OSO₃H | ″ |
| 13 | 1-NHSO₂CH₃, 4-S-(2-amino-4-sulfophenyl)anthraquinone derivative | ″ | 4-H₂N-phenyl-SO₂C₂H₄OSO₃H | ″ |

TABLE-continued
| Run No. | 1st | 2nd | 3rd | 4th |
|---|---|---|---|---|
| 14 | 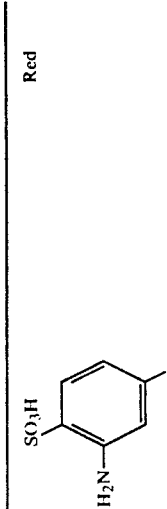 | 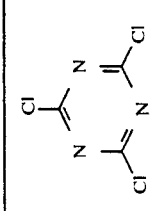 | 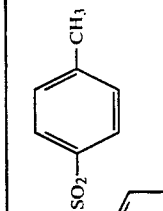 | Red |
| 15 | 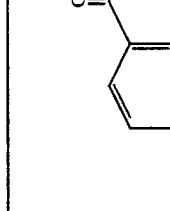 | " | " | Bluish red |
| 16 | 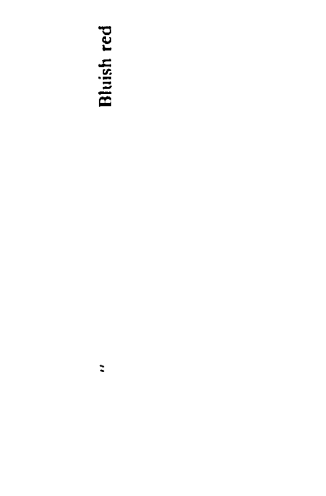 | " |  | " |
| 17 | 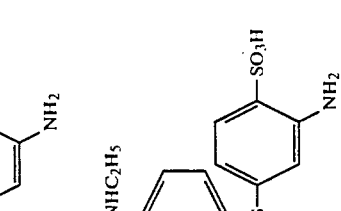 | " | 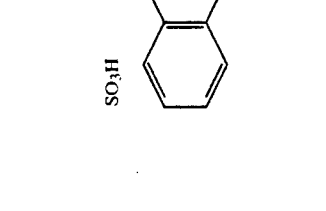 | " |

| Run No. | 1st | 2nd | 3rd | 4th |
|---|---|---|---|---|
| 18 | 1-amino-2-carboxy-4-(4-aminocyclohexylthio)anthraquinone | cyanuric chloride | 2-amino-5,8-disubstituted naphthalene (SO₂C₂H₄OSO₃H, SO₃H) | Bluish red |
| 19 | 1-ethylamino-2-carboxy-4-(2-aminoethylthio)-6-sulfoanthraquinone | " | 2-amino-5-sulfo-7-(SO₂C₂H₄OSO₃H)naphthalene | " |
| 20 | 1-methylamino-2-carboxy-4-[(4-amino-3-sulfophenyl)methylthio]anthraquinone | " | " | " |
| 21 | 1-amino-2-bromo-4-[(4-sulfo-3-aminophenyl)thio]anthraquinone | " | 3-amino-(SO₂C₂H₄OSO₃H)benzene | " |

TABLE-continued
| Run No. | 1st | 2nd | 3rd | 4th |
|---|---|---|---|---|
| 22 | 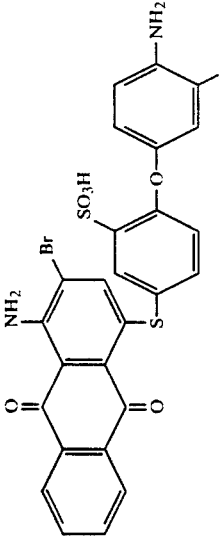 | 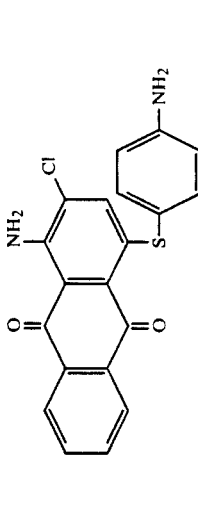 | 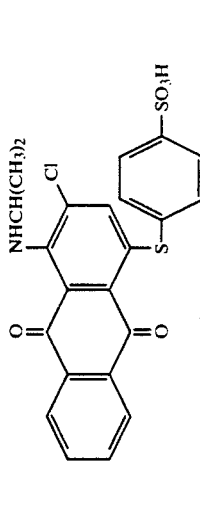 | Bluish red |
| 23 | 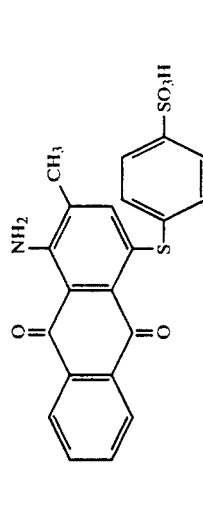 | " | 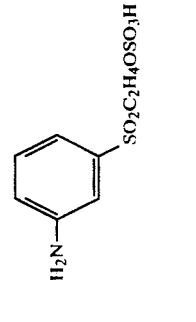 | " |
| 24 | 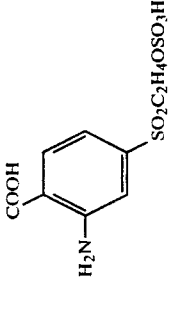 | " | 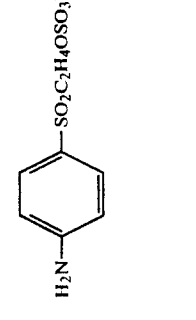 | " |
| 25 | 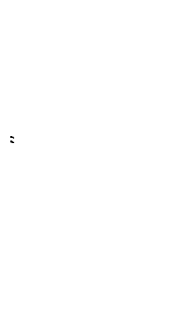 | " | | " |

EXAMPLE 15

1-Amino-2-bromo-4-(3'-amino-4'-sulfophenylthio)anthraquinone (10.1 parts), cyanuric chloride (3.7 parts) and 1-aminobenzene-4-β-sulfatoethylsulfone (5.6 parts) were subjected to condensation reactions one after another in an aqueous medium in a usual manner, followed by a condensation reaction with 3-aminobenzenesulfonic acid (3.5 parts) at 50° to 70° C. under a weak acid condition. Thereafter, salting out of the reaction mixture gave an anthraquinone compound of the following formula (free acid form).

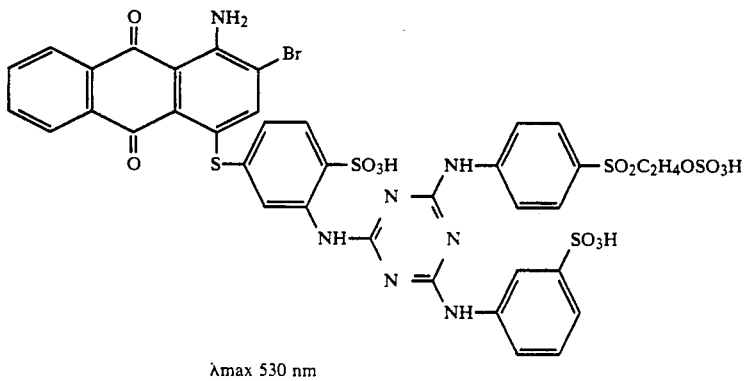

λmax 530 nm

The anthraquinone compound can be used for dyeing cellulose fiber materials, particularly those such as cotton in the manner described above for example, by the exhaustion method, to give a dyed product of a bluish red color excellent in fastness properties such as light fastness, perspiration-light fastness, perspiration fastness and the like, with high exhaustion and fixation percentage and superior build up properties.

Moreover, the anthraquinone compound is robust so that the dyeing properties are not be affected by some changes in dyeing conditions such as temperatures, bath ratios, salt concentrations and the like.

EXAMPLE 16

Example 15 was repeated, except that the compounds described in 1st, 2nd and 3rd columns of the following table were used in place of the 1-amino-2-bromo-4-(3'amino-4'-sulfophenylthio)anthraquinone, 1-aminobenzene-4-β-sulfatoethylsulfone and 3-aminobenzenesulfonic acid, respectively, thereby obtaining a corresponding anthraquinone compound. The color shade obtained by dyeing cotton with the compound is as shown in a 4th column of the table.

TABLE

| Run No. | 1st | 2nd | 3rd | 4th |
|---|---|---|---|---|
| 1 | 1-NHCN₂(CH₃)₂, 2-COOH, 4-(2-amino-4-sulfophenylthio)anthraquinone | 3-aminophenyl-SO₂C₂H₄OSO₃H | 4-aminophenyl-SO₃H | Bluish red |
| 2 | " | N-ethylaniline | | " |
| 3 | " | 4-chloro-N-ethylaniline | | " |
| 4 | 1-cyclohexylamino-4-(2-amino-4-sulfophenylthio)anthraquinone | 2-amino-1,4-benzenedisulfonic acid | 3-aminophenyl-SO₂C₂H₄OSO₃H | " |

TABLE-continued
| Run No. | 1st | 2nd | 3rd | 4th |
|---|---|---|---|---|
| 5 | 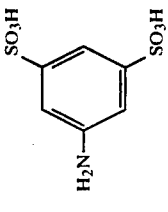 | 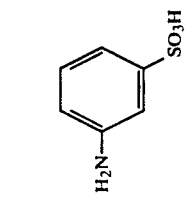 | 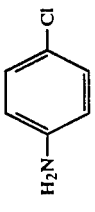 | Bluish red |
| 6 | 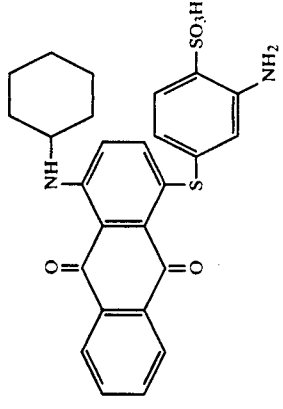 | " | 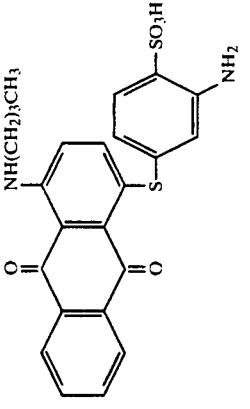 | " |
| 7 | 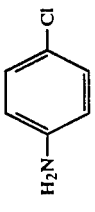 | " | 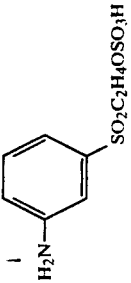 | " |
| 8 | " | (see structure) | H₂NC₂H₅ | " |

TABLE-continued

| Run No. | 1st | 2nd | 3rd | 4th |
|---|---|---|---|---|
| 9 | 1-NH₂, 2-Br anthraquinone with S-linked 2-amino-4-sulfo phenyl | 3-aminophenyl-SO₂C₂H₄OSO₃H | 3-aminotoluene (H₂N-C₆H₄-CH₃) | Bluish red |
| 10 | " | " | 4-aminobenzoic acid (H₂N-C₆H₄-COOH) | " |
| 11 | 1-NHC₂H₄OCH₃ anthraquinone with S-linked 2-amino-4-sulfo phenyl | 4-aminophenyl-SO₂C₂H₄OSO₃H | 3-aminophenyl-SO₂C₂H₄OSO₃H | " |
| 12 | " | " | 4-aminophenyl-SO₂C₂H₄OSO₃H | " |
| 13 | 1-NHC₂H₄OSO₃H anthraquinone with S-linked 4-amino-3-sulfo phenyl | 3-(N-ethylamino)phenyl-SO₂C₂H₄OSO₃H | 3-aminophenyl-SO₂C₂H₄OSO₃H | Bluish red |

TABLE-continued

| Run No. | 1st | 2nd | 3rd | 4th |
|---|---|---|---|---|
| 14 | 1-cyclohexylamino-4-(2-amino-4-sulfo-phenylthio)anthraquinone | 4-(N-ethylamino)-benzene SO$_2$C$_2$H$_4$OSO$_3$H | 4-amino-2-methoxy-benzene SO$_2$C$_2$H$_4$OSO$_3$H (with OCH$_3$) | " |
| 15 | " | 4-amino-2-methoxy-benzene SO$_2$C$_2$H$_4$OSO$_3$H | 3-amino-benzene SO$_2$C$_2$H$_4$OSO$_3$H | " |
| 16 | 1-ethylamino-2-carboxy-4-(2-amino-4-sulfo-phenylthio)anthraquinone | 2-chloroaniline | 3-amino-benzene SO$_2$C$_2$H$_4$OSO$_3$H | " |
| 17 | 1-ethylamino-2-carboxy-4-(2-amino-4-sulfo-phenylthio)anthraquinone | 3-amino-benzene SO$_2$C$_2$H$_4$OSO$_3$H | H$_2$N—C$_2$H$_4$OH | Bluish red |

TABLE-continued

| Run No. | 1st | 2nd | 3rd | 4th |
|---|---|---|---|---|
| 18 | [anthraquinone structure with NH₂, COOH, S-linked phenyl-SO₃H, NH₂] | " | H₂N—C₂H₄SO₃H | " |
| 19 | [anthraquinone structure with NH₂, Br, SO₃H, S—C₃H₆NH₂] | " | HN(C₂H₅)₂ | " |
| 20 | [anthraquinone structure with NH₂, Br, S—C₂H₄O-phenyl(SO₃H, NH₂, SO₃H)] | " | HN(C₂H₄OCH₃)(C₂H₅) | " |

EXAMPLE 17

1-(2'-Sulfatoethylamino)-4-(3'-amino-4'-sulfophenylthio)anthraquinone (11.0 parts) and cyanuric chloride (3.7 parts) were subjected a to condensation reaction at 5° to 30° C. in an aqueous medium under a weak acid condition. Thereafter, salting out of the reaction mixture gave an anthraquinone compound of the following formula (free acid form).

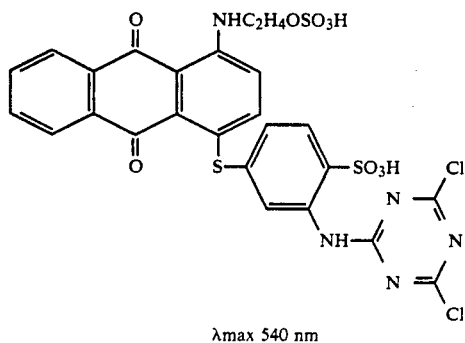

λmax 540 nm

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness and the like, with high exhaustion and fixation percentages and superior build up properties.

EXAMPLE 18

Example 17 was repeated, except that the compounds described in 1st and 2nd columns of the following table were used in place of the 1-(2'-sulfatoethylamino)-4-(3'-amino-4'-sulfophenylthio)anthraquinone and cyanuric chloride, respectively, thereby obtaining a corresponding anthraquinone compound. The compound gave a dyed product of cotton in the color shade described in a 3rd column of the table and exhibited superior dye performances as described hereinabove.

TABLE

| Run No. | 1st | 2nd | 3rd |
|---|---|---|---|
| 1 | anthraquinone with NH₂, COOH, S-phenyl-SO₃H, NH₂ substituents | cyanuric chloride (triazine with 3 Cl) | Bluish red |
| 2 | " | Cl, Cl, CH₃, SO₂CH₃ substituted pyrimidine | " |
| 3 | " | F, Cl, F, F substituted pyrimidine | " |
| 4 | anthraquinone with NHCH(CH₃)₂, COOH, S-phenyl-SO₃H, NH₂ substituents | F, Cl, CH₃, F substituted pyrimidine | " |

TABLE-continued

| Run No. | 1st | 2nd | 3rd |
|---|---|---|---|
| 5 | [anthraquinone with NHCH(CH₃)₂, COOH, and S-phenyl(SO₃H)(NH₂) substituents] | [tetrachloropyrimidine] | Bluish red |
| 6 | [anthraquinone with NH₂, Br, and S-phenyl(NH₂)(SO₃H) substituents] | [dichloro-cyano pyrimidine] | " |
| 7 | [anthraquinone with SO₃H, NH-cyclohexyl, and S-phenyl(SO₃H)(NH₂) substituents] | [cyanuric chloride] | " |
| 8 | [anthraquinone with NHC₂H₄SO₃H, CH₃, and S-phenyl(SO₃H)(NH₂) substituents] | [cyanuric chloride] | Bluish red |
| 9 | [anthraquinone with NH₂, COOH, and O-phenyl(SO₃H)(NH₂) substituents] | [chloro-difluoro-fluoropyrimidine] | Yellowish red |
| 10 | [anthraquinone with NHC₂H₄OCH₃ and O-phenyl(SO₃H)(NH₂)(SO₃H) substituents] | " | " |

EXAMPLE 19

1-Amino-2-carboxy-4-bromoanthraquinone (6.9 parts) and 4-(4'-β-hydroxyethylsulfonylphenoxy)thiophenol (6.5 parts) were allowed to react with each other at 100° to 120° C. in O-dichlorobenzene in the presence of cuprous chloride and potassium carbonate. Thereafter, methanol was added to the reaction mixture to deposit solids, which were collected on a filter, washed throughly with methanol and water and then dried at 80° C. The resulting product was subjected to sulfonation and esterification simultaneously at 20° to 40° C. in 14% oleum. Thereafter, ice was added thereto, and the solids deposited were collected on a filter, thereby obtaining an anthraquinone compound of the following formula (free acid form).

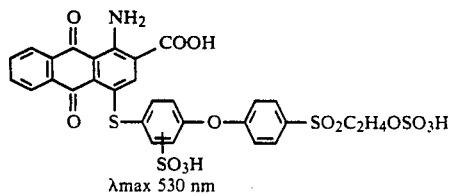

λmax 530 nm

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness and the like with high exhaustion and fixation percentages and superior build-up properties.

EXAMPLE 20

Example 19 was repeated, except that the compounds shown in 1st and 2nd columns of the following table were used in place of the 1-amino-2-carboxy-4-bromoanthraquinone and 4-(4'-β-hydroxyethylsulfonylphenoxy)thiophenol, respectively, thereby obtaining a corresponding anthraquinone compound. The color shade obtained by dyeing cotton with the compound is as shown in a 3rd column of the table.

TABLE

| Run No. | 1st | 2nd | 3rd |
|---|---|---|---|
| 1 | 1-cyclohexylamino-4-bromoanthraquinone | HS—C₆H₄—O—C₆H₄—SO₂C₂H₄OH | Bluish red |
| 2 | 1-isopropylamino-2-carboxy-4-bromoanthraquinone | HS—C₆H₄—NH—C₆H₄—SO₂C₂H₄OH | " |
| 3 | 1-(2-hydroxyethylamino)-4-bromoanthraquinone | HS—C₆H₄—NHCO—C₆H₄—SO₂C₂H₄OH | " |
| 4 | 1-anilino-4-chloroanthraquinone | HS—C₆H₄—C₂H₄SO₂C₂H₄OH | " |
| 5 | 1-anilino-4-chloroanthraquinone | HS—C₆H₄—O—C₆H₄—SO₂C₂H₄OH | " |

EXAMPLE 21

1-Amino-2-carboxy-4-(3'-amino-4'-sulfophenylthio)anthraquinone (9.4 parts) and cyanuric chloride (3.7 parts) were subjected to condensation reaction in an aqueous medium in a usual manner, followed by a condensation reaction with 3-aminobenzenesulfonic acid (3.5 parts) at 20° to 40° C. under a weak acid condition, thereby obtaining an anthraquinone compound of the following formula (free acid form).

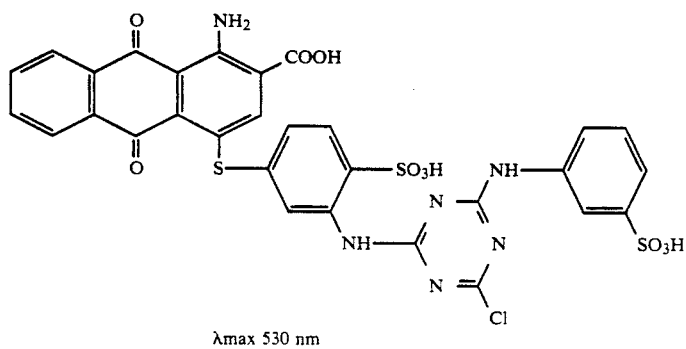

λmax 530 nm

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness and the like with high exhaustion and fixation percentages and superior build-up properties.

EXAMPLE 22

Example 21 was repeated, except that the compounds shown in 1st, 2nd and 3rd columns of the following table were used in place of the 1-amino-2-carboxy-4-(3'-amino-4'-sulfophenylthio)anthraquinone, cyanuric chloride and 3-aminobenzenesulfonic acid, respectively, thereby obtaining a corresponding anthraquinone compound. The color shade on cotton of the compound is as shown in a 4th column of the table.

TABLE

| Run No. | 1st | 2nd | 3rd | 4th |
|---|---|---|---|---|
| 1 | anthraquinone with NHCH(CH₃)₂, COOH, S-phenyl(SO₃H)(NH₂) | cyanuric chloride | 2,4-diaminobenzenesulfonic acid (H₂N-C₆H₃(SO₃H)₂ with NH₂) | Bluish red |
| 2 | " | " | sulfanilic acid (H₂N-C₆H₄-SO₃H) | " |
| 3 | anthraquinone with NH-cyclohexyl, SO₃H, S-phenyl(SO₃H)(NH₂) | " | aniline (H₂N-C₆H₅) | " |
| 4 | anthraquinone with NHC₂H₄OSO₃H, S-phenyl(SO₃H)(NH₂) | " | H₂N—C₂H₄SO₃H | " |

TABLE-continued

| Run No. | 1st | 2nd | 3rd | 4th |
|---|---|---|---|---|
| 5 | Anthraquinone derivative with NHC₂H₄OSO₃H, COOH, S-phenyl-SO₃H/NH₂ substituents | Triazine with F, F, F | H₂N—C₂H₄OH | Bluish red |
| 6 | Anthraquinone derivative with NHC₂H₅, Br, S-phenyl-NHCO-(phenyl-SO₃H, NH₂) | Triazine with Cl, Cl, Cl | C₆H₅-NH-C₂H₅ (N-ethylaniline) | " |
| 7 | Anthraquinone derivative with NHCH(CH₃)₂, Cl, S-phenyl-SO₃H/NH₂ | " | 3-methylaniline (H₂N-C₆H₄-CH₃) | " |
| 8 | " | " | 4-chloroaniline (H₂N-C₆H₄-Cl) | " |
| 9 | Anthraquinone derivative with NH(CH₂)₃CH₃, SC₂H₄NH₂, SO₃H | Triazine with Cl, Cl, Cl | 6-aminonaphthalene-2-sulfonic acid (H₂N-naphthyl-SO₃H) | Bluish red |

TABLE-continued

| Run No. | 1st | 2nd | 3rd | 4th |
|---|---|---|---|---|
| 10 | anthraquinone with NH-C6H4-SO3H and S-C6H3(CH3)-NH2 substituents, and SO3H on ring | " | H2NCH2-C6H5 | " |
| 11 | anthraquinone with NH2, COOH, and S-C6H3(SO3H)-NH2 substituents | " | H2N-C6H4-CONHC2H4SO2C2H4Cl | " |
| 12 | anthraquinone with NH2, COOH, and O-C6H3(SO3H)-NH2 substituents | " | " | Yellowish red |
| 13 | anthraquinone with NH-cyclohexyl and O-C6H2(SO3H)(NH2)(SO3H) substituents | cyanuric fluoride (N3C3F3) | H2N-C6H3(SO3H)2 | Yellowish red |

TABLE-continued

| Run No. | 1st | 2nd | 3rd | 4th |
|---|---|---|---|---|
| 14 | anthraquinone structure with NHCH(CH₃)₂, SO₃H, and linked via O to phenyl-O-phenyl with SO₃H and NH₂ substituents | cyanuric chloride (2,4,6-trichloro-1,3,5-triazine) | HN(C₂H₅)₂ (diethylamine) | " |
| 15 | anthraquinone structure with NH-phenyl-SO₃H, OC₂H₄NH₂, and SO₃H substituents | " | 2,5-disulfoaniline (H₂N-phenyl with SO₃H at 2 and 5 positions) | " |

EXAMPLE 23

1-Amino-4-(3'-amino-2',4',6'-trimethyl-5'-sulfophenylthio)anthraquinone-2-sulfonic acid (23.7 parts) and cyanuric chloride (9.3 parts) were subjected a to condensation reaction at 10° to 20° C. in an aqueous medium under a weak acid condition, followed by a condensation reaction with 1-aminobenzene-3-β-sulfatoethylsulfone (14.1 parts) at 20° to 30° C. under a weak acid condition. Thereafter, salting out of the reaction mixture gave an anthraquinone compound of the following formula (free acid form).

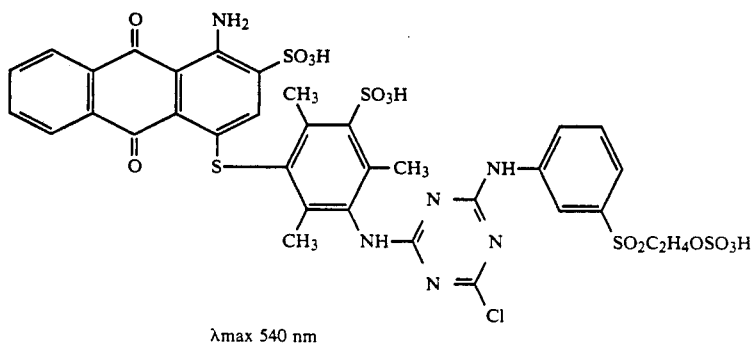

λmax 540 nm

The anthraquinone compound can be used for dyeing cellulose fiber materials, particularly those such as cotton, in the manner described hereinabove, for example, by the exhaustion method, to give a dyed product of a bluish red color excellent in fastness properties such as light fastness, perspiration-light fastness, perspiration fastness and the like, with high exhaustion and fixation percentages and superior build-up properties.

EXAMPLE 24

Example 23 was repeated, except that the compounds shown in 1st, 2nd and 3rd columns of the following table were used in place of the 1-amino-4-(3'-amino-2',4',6'-trimethyl-5'-sulfophenylthio)anthraquinone-2-sulfonic acid, cyanuric chloride and 1-aminobenzene-3-β-sulfatoethylsulfone, respectively thereby obtaining a corresponding anthraquinone compound. The color shade on cotton of the compound is as shown in a 4th column of the table.

TABLE

| Run No. | 1st | 2nd | 3rd | 4th |
|---|---|---|---|---|
| 1 | 1-amino-4-[(2,4,6-trimethyl-3-sulfo-5-amino)phenylthio]-anthraquinone-2-sulfonic acid | cyanuric chloride | 4-aminophenyl-SO$_2$C$_2$H$_4$OSO$_3$H | Bluish red |
| 2 | " | " | 3-(N-ethylamino)phenyl-SO$_2$C$_2$H$_4$OSO$_3$H | " |
| 3 | 1-amino-4-[(2-amino-4-sulfo)phenylthio]-anthraquinone-2-sulfonic acid | " | 3-amino-4-methoxyphenyl-SO$_2$C$_2$H$_4$OSO$_3$H | " |
| 4 | " | cyanuric fluoride | 4-aminophenyl-SO$_2$C$_2$H$_4$OSO$_3$H | " |
| 5 | 1-amino-4-[(2-amino-4-sulfo)phenylthio]-anthraquinone-2-sulfonic acid | " | 4-aminophenyl-SO$_2$C$_2$H$_4$OSO$_3$H | Bluish red |

TABLE-continued

| Run No. | 1st | 2nd | 3rd | 4th |
|---|---|---|---|---|
| 6 | 1-amino-2-sulfo-4-[(4-amino-3-sulfophenyl)thio]anthraquinone | cyanuric chloride | 3-aminophenyl-SO$_2$CH=CH$_2$ | " |
| 7 | " | " | 4-(N-ethylamino)phenyl-SO$_2$C$_2$H$_4$OSO$_3$H | " |
| 8 | 1-amino-2-sulfo-4-[(6-amino-4-sulfo-2-methylphenyl)thio]anthraquinone | " | 2-methyl-5-amino-phenyl-SO$_2$C$_2$H$_4$OSO$_3$H | " |
| 9 | 1-amino-2-sulfo-4-[(4-sulfo-3-aminomethylphenyl)thio]anthraquinone | cyanuric chloride | 2-methoxy-3-amino-phenyl-SO$_2$C$_2$H$_4$OSO$_3$H | Bluish red |

TABLE-continued

| Run No. | 1st | 2nd | 3rd | 4th |
|---|---|---|---|---|
| 10 | anthraquinone with NH₂, SO₃H, S-aryl(SO₃H, CH₂NH₂) substituents | cyanuric chloride | 2,5-dimethoxy-4-aminobenzene with SO₂C₂H₄OSO₃H | " |
| 11 | anthraquinone with NH₂, SO₃H, S-aryl(OCH₃, CH₂NH₂, SO₃H) substituents | cyanuric chloride | 3-aminophenyl-SO₂C₂H₄OSO₃H | " |
| 12 | anthraquinone with NH₂, SO₃H, S-aryl(SO₃H, CH₂NH₂, SO₃H) substituents | " | " | " |
| 13 | anthraquinone with NH₂, SO₃H, S-C₂H₄-aryl(SO₃H, NH₂) substituents | cyanuric chloride | 4-amino-3-sulfo-phenyl-SO₂C₂H₄OSO₃H | Bluish red |

TABLE-continued
| Run No. | 1st | 2nd | 3rd | 4th |
|---|---|---|---|---|
| 14 | 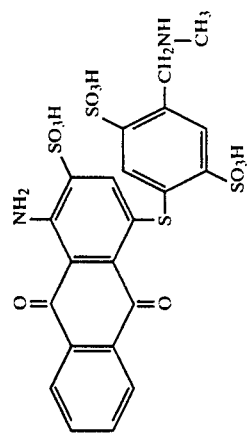 | " | 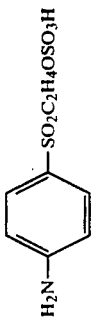 | " |
| 15 | 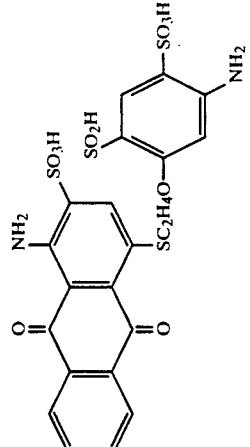 | " | 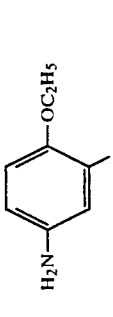 | " |
| 16 | 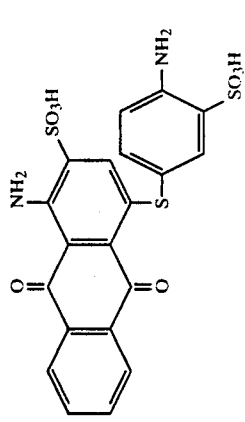 | 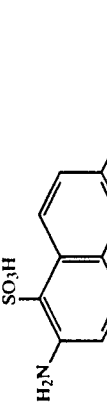 | 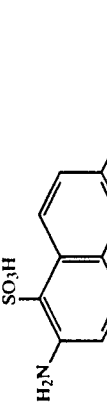 | Bluish red |
| 17 | " | " | 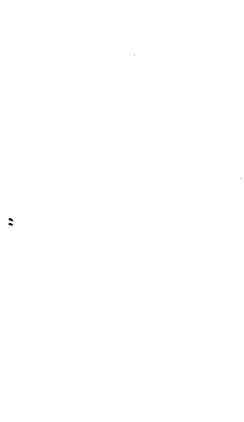 | " |

| Run No. | 1st | 2nd | 3rd | 4th |
|---|---|---|---|---|
| 18 | [anthraquinone structure with NH2, SO3H, S-linked aminobenzenesulfonic acid] | " | [naphthalene with H2N, SO3H, SO2C2H4OSO3H] | " |
| 19 | " | [cyanuric chloride structure] | [naphthalene with H2N, SO2C2H4OSO3H] | " |
| 20 | [anthraquinone structure with NH2, SO3H, S-linked aminobenzenesulfonic acid] | " | [phenyl with C2H4OH-NH, SO2C2H4OSO3H] | Bluish red |
| 21 | [anthraquinone structure with NHCH3, SO3H, S-linked aminobenzenesulfonic acid] | " | [phenyl with H2N, SO2C2H4OSO3H] | " |

TABLE-continued

| Run No. | 1st | 2nd | 3rd | 4th |
|---|---|---|---|---|
| 22 | anthraquinone with NHCOCH₃, SO₃H, S-linked to aminobenzene-SO₃H/NH₂ | " | 3-methylamino-phenyl-SO₂C₂H₄OSO₃H | Red |
| 23 | anthraquinone with NHCOCH₃, SO₃H, S-linked to aminobenzene-SO₃H/NH₂ | cyanuric chloride (triazine with Cl, N, Cl, N, Cl, N) | 3-methylamino-phenyl-SO₂C₂H₄OSO₃H | Red |
| 24 | anthraquinone with NH-C₆H₄-SO₃H, SO₃H, S-linked to aminobenzene-SO₃H/NH₂ | " | 4-aminophenyl-SO₂CH₂CH₂Cl | " |

TABLE-continued

| Run No. | 1st | 2nd | 3rd | 4th |
|---|---|---|---|---|
| 25 | anthraquinone structure with NHCOPh, SO₃H, S-linked aminobenzenesulfonic acid | " | 2-chloro-4-(SO₂C₂H₄OSO₃H)aniline | " |
| 26 | anthraquinone structure with NHC₂H₅, SO₃H, S-linked aminobenzenesulfonic acid | cyanuric chloride | 3-(SO₂C₂H₄OSO₃H)aniline (HN-) | Bluish red |
| 27 | anthraquinone structure with NH(CH₂)₂CH₃, SO₃H, S-linked aminobenzenesulfonic acid | " | 3-(SO₂C₂H₄OSO₃H)-N-propylaniline | " |

TABLE-continued

| Run No. | 1st | 2nd | 3rd | 4th |
|---|---|---|---|---|
| 28 | anthraquinone with NHCH(CH$_3$)$_2$, SO$_3$H, S-linked phenyl with SO$_3$H and NH$_2$ | " | aminophenyl with OCH$_3$, CH$_3$, SO$_2$C$_2$H$_4$OSO$_3$H (H$_2$N-) | " |
| 29 | anthraquinone with NHC$_2$H$_4$OCH$_3$, SO$_3$H, S-linked phenyl with NH$_2$ and SO$_3$H | cyanuric chloride (triazine with Cl, N, Cl, N, Cl, N) | 4-aminophenyl with C$_2$H$_5$ | Bluish red |
| 30 | anthraquinone with NHC$_2$H$_4$COOH, SO$_3$H, S-linked phenyl with SO$_3$H and NH$_2$ | " | aminophenyl with C$_2$H$_5$, SO$_2$C$_2$H$_4$OSO$_3$H | " |
| 31 | anthraquinone with NHC$_2$H$_4$OSO$_3$H, SO$_3$H, S-linked phenyl with SO$_3$H and NH$_2$ | " | 4-aminophenyl-SO$_2$C$_2$H$_4$OSO$_3$H | " |

TABLE-continued

| Run No. | 1st | 2nd | 3rd | 4th |
|---|---|---|---|---|
| 32 | (anthraquinone structure with NH-cyclohexyl, SO₃H, S-linked aminobenzenesulfonic acid) | cyanuric chloride (triazine with 2 Cl, 1 N linkage) | 4-aminophenyl-SO₂C₂H₄OSO₃H | Red |
| 33 | (anthraquinone with NH₂, SO₃H, S-cyclohexylamine) | " | " | Bluish red |
| 34 | (anthraquinone with NH₂, SO₃H, S-cyclohexylamine, additional SO₃H) | " | 3-aminophenyl-SO₂C₂H₄OSO₃H | " |
| 35 | (anthraquinone with NH₂, SO₃H, S-cyclohexylamine, additional SO₃H) | " | " | " |

TABLE-continued

| Run No. | 1st | 2nd | 3rd | 4th |
|---|---|---|---|---|
| 36 | anthraquinone derivative with NH₂, SO₃H, SO₃H, SO₃H, and S-cyclohexyl(CH₃)(NH₂) substituents | dichlorotriazine | 3-aminophenyl-SO₂C₂H₄OSO₃H | Bluish red |
| 37 | anthraquinone derivative with NH₂, SO₃H, SO₃H, and S-cyclohexyl(CH₃)₂(NH₂) substituents | " | " | " |
| 38 | anthraquinone with NH₂, SO₃H, SC₂H₄NH₂ | " | " | " |
| 39 | anthraquinone with NH₂, SO₃H, SO₃H, S(CH₂)₃NH₂ | dichlorotriazine | " | " |
| 40 | anthraquinone with NH₂, SO₃H, SO₃H, S(CH₂)₄NH₂ | dichlorotriazine | 3-aminophenyl-SO₂C₂H₄OSO₃H | Bluish red |

TABLE-continued

| Run No. | 1st | 2nd | 3rd | 4th |
|---|---|---|---|---|
| 41 | anthraquinone dye structure with NH₂, SO₃H, biphenyl-SO₃H, NH₂ | " | " | " |
| 42 | anthraquinone dye structure with NH₂, SO₃H, S, biphenyl-SO₃H, NH₂ | " | phenyl with C₂H₅-HN and SO₂C₂H₄OSO₃H | " |
| 43 | anthraquinone dye structure with NH₂, SO₃H, S, phenyl-NH-phenyl-SO₃H, NH₂ | " | " | " |
| 44 | anthraquinone dye structure with NH₂, SO₃H, S, phenyl-NH-phenyl-SO₃H, NH₂ | " | phenyl with H₂N and SO₂C₂H₄OSO₃H | Bluish red |

TABLE-continued

| Run No. | 1st | 2nd | 3rd | 4th |
|---|---|---|---|---|
| 45 | ![structure: 1-amino-2-sulfo-4-[(4-(4-amino-3-sulfophenoxy)-2-sulfophenyl)thio]anthraquinone] | " | " | " |

EXAMPLE 25

1-Amino-4-(3'-amino-2',4',6'-trimethyl-5'-sulfophenylthio)anthraquinone-2-sulfonic acid (23.7 parts), cyanuric chloride (9.3 parts) and 1-aminobenzene-3-$\beta$-sulfatoethylsulfone (14.1 parts) were subjected to condensation reactions one after another in an aqueous medium in a usual manner, followed by a further condensation reaction with 3-aminobenzenesulfonic acid (8.7 parts) at 50° to 60° C. under a weak acid condition. Thereafter, salting out of the reaction mixture gave an anthraquinone compound of the following formula (free acid form).

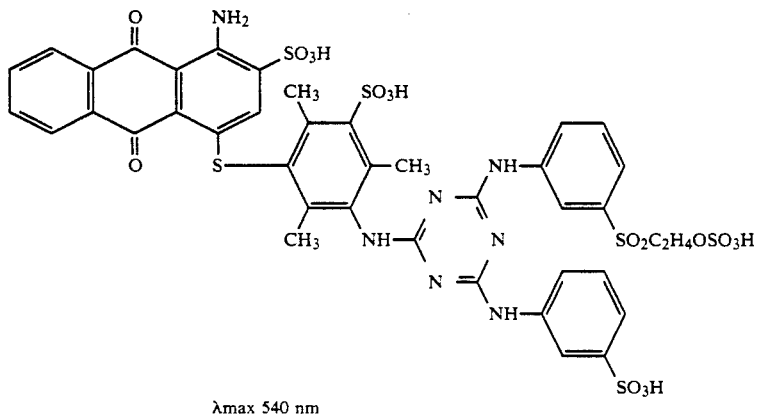

λmax 540 nm

The anthraquinone compound can be used for dyeing cellulose fiber materials, particularly those such as cotton, in the manner described hereinabove, for example, by the exhaustion method, to give a dyed product of a bluish red color excellent in fastness properties such as light fastness, perspiration-light fastness, perspiration fastness and the like with high exhaustion and fixation percentages and superior build-up properties.

EXAMPLE 26

Example 25 was repeated, except that the compounds shown in 1st, 2nd and 3rd columns of the following table were used in place of the 1-amino-4-(3'-amino-2',4',6'-trimethyl-5'-sulfophenylthio)anthraquinone-2-sulfonic acid, 1-aminobenzene-3-$\beta$-sulfatoethylsulfone and 3-aminobenzenesulfonic acid, respectively, thereby obtaining a corresponding anthraquinone compound. The color shade on cotton of the compound is as shown in a 4th column of the table.

TABLE

| Run No. | 1st | 2nd | 3rd | 4th |
|---|---|---|---|---|
| 1 | Anthracenedione derivative with NH₂, SO₃H, S-linked aminobenzenesulfonic acid | 3-H₂N-C₆H₄-SO₂C₂H₄OSO₃H | 4-H₂N-C₆H₄-SO₃H | Bluish red |
| 2 | " | C₆H₅-NH-C₂H₅ | 3-H₂N-C₆H₄-SO₂C₂H₄OSO₃H | " |
| 3 | " | 4-Cl-C₆H₄-N(C₂H₅)H | " | " |
| 4 | " | 4-H₂N-C₆H₄-SO₂C₂H₄OSO₃H | C₆H₅-NH₂ | " |
| 5 | Anthracenedione derivative with NH₂, SO₃H, S-linked aminobenzenesulfonic acid | 4-H₂N-C₆H₄-SO₂C₂H₄OSO₃H | 4-H₂N-C₆H₄-OCH₃ | Bluish red |

TABLE-continued

| Run No. | 1st | 2nd | 3rd | 4th |
|---|---|---|---|---|
| 6 | anthraquinone structure with NH₂, SO₃H, SO₂H, NH₂, S linkage | 3-aminophenyl-SO₂C₂H₄OSO₃H | 3-aminophenyl-SO₃H | " |
| 7 | " | " | 4-chloroaniline | " |
| 8 | | | H₂NC₂H₅ | |
| 9 | anthraquinone structure with NH₂, SO₃H, SO₂H, NH₂, S linkage | 3-aminophenyl-SO₂C₂H₄OSO₃H | 3-aminotoluene (m-CH₃) | Bluish red |
| 10 | " | " | 4-aminobenzoic acid (COOH) | " |
| 11 | anthraquinone structure with NH₂, SO₃H, NH₂, SO₃H, S linkage | 4-aminophenyl-SO₂C₂H₄OSO₃H | 3-aminophenyl-SO₂C₂H₄OSO₃H | " |

TABLE-continued

| Run No. | 1st | 2nd | 3rd | 4th |
|---|---|---|---|---|
| 12 | " | | | " |
| 13 | (1-amino-anthraquinone with SO₃H, S-linked to aminobenzenesulfonic acid) | 3-(ethylamino)phenyl-SO₂C₂H₄OSO₃H | 4-aminophenyl-SO₂C₂H₄OSO₃H | Bluish red |
| 14 | (1-amino-anthraquinone with SO₃H, S-linked to trimethyl-amino-sulfo-benzene) | 4-(ethylamino)phenyl-SO₂C₂H₄OSO₃H | 3-amino-4-methoxyphenyl-SO₂C₂H₄OSO₃H | " |
| 15 | " | 2,5-dimethoxy-4-amino-phenyl-SO₂C₂H₄OSO₃H with CH₃ | 3-aminophenyl-SO₂C₂H₄OSO₃H | " |
| 16 | (1-amino-anthraquinone with SO₃H, S-linked to aminobenzenesulfonic acid) | N-methylanilino | " | " |

TABLE-continued

| Run No. | 1st | 2nd | 3rd | 4th |
|---|---|---|---|---|
| 17 | (anthracenedione with NH₂, SO₃H, S-C₆H₃(SO₂H)(NH₂)) | 2-chloroaniline | 3-aminophenyl-SO₂C₂H₄OSO₃H | Bluish red |
| 18 | (anthraquinone with NH₂, SO₃H, SC₂H₄NH₂, SO₃H) | N-ethylaniline | " | " |
| 19 | (anthracenedione with NH₂, SO₃H, S-cyclohexyl-NH₂) | 3-aminophenyl-SO₂C₂H₄OSO₃H | 3,5-disulfoaniline | " |
| 20 | (anthracenedione with NH₂, SO₃H, S-C₆H₃(SO₃H)(CH₂NH₂)) | " | " | " |

TABLE-continued

| Run No. | 1st | 2nd | 3rd | 4th |
|---|---|---|---|---|
| 21 | anthraquinone-S-aryl structure with NH₂, SO₃H substituents linked via NH to phenyl with SO₃H and NH₂, SO₃H | 3-aminophenyl-SO₂C₂H₄OSO₃H | H₂N—C₂H₄OH | Bluish red |
| 22 | anthraquinone with NH₂, SO₃H, S-aryl(SO₂H, NH₂) | " | H₂N—C₂H₄SO₃H | " |
| 23 | " | 4-aminophenyl-SO₂C₂H₄OSO₃H | HN(C₂H₅)₂ | " |
| 24 | anthraquinone-S-aryl structure with NH₂, SO₃H linked via NH to phenyl with SO₃H and NH₂, SO₃H | " | HN(C₂H₄OH)₂ | " |

| Run No. | 1st | 2nd | 3rd | 4th |
|---|---|---|---|---|
| 25 | [anthraquinone structure with NH2, SO3H, S-linked phenyl-SO3H, NHCO-C6H4-NH2] | " | HN(C2H4OCH3)(C2H5) | Bluish red |
| 26 | [anthraquinone structure with NH2, SO3H, S-linked phenyl-SO2H-NH2] | 3-H2N-C6H4-SO2C2H4OSO3H | H2NCH2 (phenyl) | " |
| 27 | " | " | 6-amino-2-naphthalene-SO3H | " |
| 28 | " | " | 3-H2N-C6H4-SO2(CH2)2CH3 | " |
| 29 | [anthraquinone structure with NH2, SO3H, S-linked phenyl-SO2H-NH2] | 2-amino-1,4-benzene-SO3H, aminobenzene-SO3H | 3-H2N-C6H4-SO2CH2CH2Cl | Bluish red |
| 30 | " | 8-SO2C2H4OSO3H-6-amino-2-naphthalene-SO3H | 4-amino-1,3-benzene-di-SO3H | " |

EXAMPLE 27

1-Amino-4-(3'-amino-2',4',6'-trimethyl-5'-sulfophenylthio)anthraquinone-2-sulfonic acid (23.7 parts), cyanuric chloride (9.3 parts) and 1-aminobenzene-3-β-sulfatoethylsulfone (14.1 parts) were subjected to condensation reactions one after another in an aqueous medium in a usual manner, followed by a condensation reaction with pyridine (4.5 parts) at 60° to 70° C. under a weak acid condition. Thereafter, salting out of the reaction mixture gave an anthraquinone compound of the following formula (free acid form).

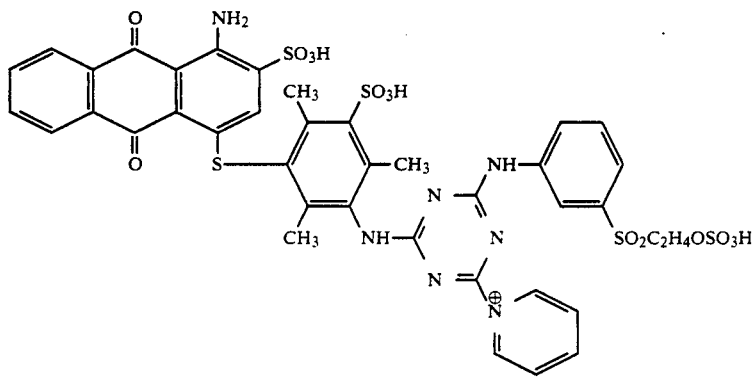

λmax 540 nm

The anthraquinone compound can be used for dyeing cellulose fiber materials, particularly those such as cotton, in the manner described hereinabove, for example, by the exhaustion method, to give a dyed product of a bluish red color excellent in fastness properties such as light fastness, perspiration-light fastness, perspiration fastness and the like with high exhaustion and fixation percentages and superior build-up properties.

EXAMPLE 28

Example 27 was repeated, except that the compounds shown in 1st, 2nd and 3rd columns of the following table were used in place of the 1-amino-4-(3'-amino-2',4',6'-trimethyl-5'-sulfophenylthio)anthraquinone-2-sulfonic acid, 1-aminobenzene-3-β-sulfatoethylsulfone and pyridine, respectively, thereby obtaining a corresponding anthraquinone compound. The color shade on cotton of the compound is as shown in a 4th column of the table.

| Run No. | 1st | 2nd | 3rd | 4th |
|---|---|---|---|---|
| 1 | [anthraquinone structure with NH₂, SO₃H, SO₂H, NH₂, S linkage, O, O] | 3-aminophenyl-SO₂C₂H₄OSO₃H | pyridine-3-COOH | Bluish red |
| 2 | " | " | pyridine-4-COOH | " |
| 3 | " | " | pyridine-3-SO₃H | " |
| 4 | " | 4-aminophenyl-SO₂C₂H₄OSO₃H | pyridine-2-C₂H₄OH | " |
| 5 | [anthraquinone structure with NH₂, SO₃H, SO₂H, NH₂, S linkage, O, O] | 4-aminophenyl-SO₂C₂H₄OSO₃H | pyridine-3-CONH₂ | Bluish red |

-continued

| Run No. | 1st | 2nd | 3rd | 4th |
|---|---|---|---|---|
| 6 | (anthraquinone structure with NH₂, SO₃H, CH₃, CH₃, CH₃, SO₃H, NH₂, S linkage) | 3-aminophenyl-SO₂C₂H₄OSO₃H | N(CH₃)₃ | " |
| 7 | " | " | N(C₂H₅)₃ | " |
| 8 | " | " | CH₃—N(CH₃)—C₂H₄OSO₃H | " |
| 9 | (anthraquinone structure with NH₂, SO₃H, SO₂H, NH₂, S linkage) | 3-aminophenyl-SO₂C₂H₄OSO₃H | CH₃—N(CH₃)—C₃H₇-n | Bluish red |
| 10 | " | 4-chloro-3-aminophenyl-SO₂C₂H₄OSO₃H | N(CH₃)₃ | " |

-continued

| Run No. | 1st | 2nd | 3rd | 4th |
|---|---|---|---|---|
| 11 | anthraquinone with NH₂, SO₃H, O-phenyl(SO₃H, NH₂) | H₂N–C₆H₄–SO₂C₂H₄OSO₃H (meta) | pyridine-3-COOH | Yellowish red |
| 12 | anthraquinone with NH₂, SO₃H, O-phenyl(SO₃H, NH₂) | " | pyridine-3-CN | " |
| 13 | tetracene-quinone with NH₂, SO₃H, O-cyclohexyl-NH₂, SO₃H | H₂N–C₆H₄–SO₂C₂H₄OSO₃H (para) | pyridine | Yellowish red |
| 14 | anthraquinone with NH₂, SO₃H, OC₂H₄NH₂, SO₃H | C₂H₅NH–C₆H₄–SO₂C₂H₄OSO₃H | N(C₂H₄OH)₃ | " |

-continued

| Run No. | 1st | 2nd | 3rd | 4th |
|---|---|---|---|---|
| 15 | [anthraquinone structure with NH₂, SO₃H, and OC₂H₄O- linked to aminobenzene with NH₂ and SO₃H] | [naphthalene with H₂N, SO₃H, and SO₂C₂H₄OSO₃H] | N(C₂H₅)₃ | " |

DYEING EXAMPLE 1

Each anthraquinone compound obtained in Examples 1, 13 and 23 (each 0.1, 0.3 and 0.6 part) was respectively dissolved in water (200 parts), and sodium sulfate (20 parts) and cotton (10 parts) were added thereto. The bath was heated to 60° C., and 30 minutes thereafter sodium carbonate (3 parts) was added thereto. Dyeing was continued for 1 hour at that temperature. Thereafter, the cotton taken out was washed with water and soaped to obtain each dyed product of a bluish red color excellent in fastness properties, particularly those such as light fastness and perspiration-light fastness, with superior build-up properties.

Each compound was also found to be superior in solubility, level-dyeing property and reproducibility.

DYEING EXAMPLE 2

The anthraquinone compound obtained in Example 5 (0.3 part) was dissolved in water (200 parts), and sodium sulfate (20 parts) and cotton (10 parts) were added thereto. The bath was heated to 40° C., and 20 minutes thereafter, trisodium phosphate (3 parts) was added thereto. Dyeing was continued for 1 hour at that temperature. Then, the cotton taken out was washed with water and soaped to obtain a dyed product of a bluish red color excellent in fastness properties.

DYEING EXAMPLE 3

Each anthraquinone compound obtained in Example 14 and Run No. 7 of Example 24 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Then, the cotton taken out was washed with water and soaped to obtain each dyed product of bluish red color excellent in fastness properties.

DYEING EXAMPLE 4

The anthraquinone compound obtained in Example 3 (each 0.1, 0.3 and 0.6 part) was dissolved in water (200 parts), sodium sulfate (30 parts) and cotton (10 parts) were added thereto. The bath was heated to 50° C., and 30 minutes thereafter sodium carbonate (3 parts) was added thereto. Dyeing was continued for 1 hour at that temperature. Then, the cotton taken out was washed with water and soaped to obtain each dyed product of a bluish red color excellent in fastness properties, particularly those such as light fastness and perspiration-light fastness, with superior build-up properties.

The compound was also found to be superior in solubility and reproducibility.

DYEING EXAMPLE 5

Each anthraquinone compound obtained in Examples 5 and 25 (each 0.1, 0.3 and 0.6 part) was dissolved in water (200 parts), and sodium sulfate (30 parts) and cotton (10 parts) were added thereto. The bath was heated to 70° C., and 30 minutes thereafter, sodium carbonate (3 parts) was added thereto. Dyeing was continued for 1 hour at that temperature. The cotton taken out was washed with water and soaped to obtain each dyed product of a bluish red color excellent in fastness properties, particularly those such as hight fastness and perspiration-light fastness, with superior build-up properties.

Each compound was also found to have superior solubility and to exhibit favorable level-dyeing property and reproducilbility.

DYEING EXAMPLE 6

The anthraquinone compound obtained in Example 7 (0.3 part) was dissolved in water (200 parts), and sodium sulfate (30 parts) and cotton (10 parts) were added thereto. The bath was heated to 50° C., and 20 minutes thereafter trisodium phosphate (3 parts) was added thereto. Dyeing was continued for 1 hour at that temperature. Then, the cotton taken out was washed with water and soaped to obtain a dyed product of a bluish red color excellent in fastness properties.

DYEING EXAMPLE 7

The anthraquinone compound obtained in Example 17 (0.3 part) was dissolved in water (200 parts), and sodium sulfate (30 parts) and cotton (10 parts) were added thereto. The bath was heated to 40° C., and 20 minutes thereafter, trisodium phosphate (3 parts) was added thereto. Dyeing was continued for 1 hour at that temperature. Then, the cotton taken out was washed with water and soaped to obtain a dyed product of a bluish red color excellent in fastness properties.

DYEING EXAMPLE 8

The anthraquinone compound obtained in Run No. 7 of Example 26 (0.3 part) was dissolved in water (200 parts), and sodium sulfate (30 parts) and cotton (10 parts) were added thereto. The bath was heated to 70° C., and 20 minutes thereafter, trisodium phosphate (3 parts) was added thereto. Dyeing was continued for 1 hour at that temperature. The cotton taken out was washed with water and soaped to out obtain a dyed product of a bluish red color excellent in fastness properties.

DYEING EXAMPLE 9

| Composition of color paste | |
|---|---|
| Each of the anthraquinone compounds obtained in Examples 11, 13 and 23 | 5 parts |
| Urea | 5 parts |
| Sodium alginate (5%), a thickner | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 100° C. for 5 minutes, washed with hot water, soaped, again washed with hot water and then dried to obtain each product printed in a bluish red color excellent in various fastness properties.

DYEING EXAMPLE 10

| Composition of color paste | |
|---|---|
| Each of the anthraquinone compounds obtained in Examples 9, 19 and 27 | 5 parts |
| Urea | 5 parts |
| Sodium alginate (5%), a thickner | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 110° C. for 5 minutes, then washed with hot water, soaped, again washed with hot water and dried to obtain each printed product of a bluish red color excellent in fastness properties.

We claim:

1. A compound represented by the following formula (I):

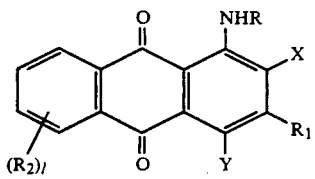

wherein R is hydrogen, alkyl, cyclohexyl, phenyl, alkylcarbonyl, benzoyl, alkylsulfonyl or phenylsulfonyl, said alkyl, alkylcarbonyl and alkylsulfonyl each being unsubstituted or substituted by methoxy, ethoxy, chloro, bromo, acetylamino, propionylamino, nitro, cyano, carbamoyl, carboxy, hydroxy, sulfato or sulfo, and said cyclohexyl, phenyl, benzoyl and phenylsulfonyl each being unsubstituted or substituted by methyl, ethyl, methoxy, ethoxy, chloro, bromo, acetylamino, propionylamino, nitro, cyano, carbamoyl, carboxy, hydroxy, sulfato or sulfo; ep1 $R_1$ and $R_2$ independently of one another are each hydrogen, halogen or sulfo; $l$ is 1 or 2;

X is hydrogen, alkyl, halogen, carboxy or sulfo; and Y is a group of the formula

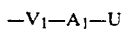

in which $V_1$ is a divalent group of —O— or —S—;

U is a group of the following formula (3) or (4), the formula (3) being

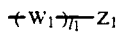

wherein $W_1$ is a divalent group of —$NR_5$— in which $R_5$ is hydrogen or alkyl unsubstituted or substituted by hydroxy, cyano, $C_1$-$C_4$ alkoxy, chloro, bromo, carboxy, carbamoyl, $C_1$-$C_4$ alkoxycarbonyl, $C_1$-$C_4$ alkylcarbonyloxy, sulfo or sulfamoyl, $Z_1$ is a fiber reactive group, and $l_1$ is 0 or 1, and the formula (4) being

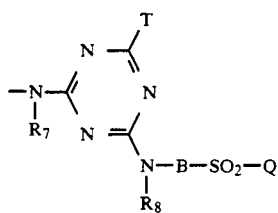

wherein $R_7$ is hydrogen or alkyl, $R_8$ is hydrogen or alkyl unsubstituted or substituted by hydroxy, B is phenylene unsubstituted or substituted by methyl, ethyl, methoxy, ethoxy, chloro, bromo, sulfo, carboxy or nitro, or napthylene unsubstituted or substituted by sulfo, Q is vinyl or —$CH_2CH_2L$ in which L is a group capable of being split by the action of an alkali, and T is fluoro, chloro or a group of the following formula (5), (6), (7) or (8), the formula (5) being

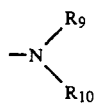

wherein $R_9$ and $R_{10}$ independently of one another are each hydrogen, alkyl unsubstituted or substituted by $C_1$-$C_4$ alkoxy, sulfo, carboxy, hydroxy, chloro, phenyl or sulfato, phenyl unsubstituted or substituted by $C_1$-$C_4$ alkyl, $C_1$-$C_4$ alkoxy, sulfo, carboxy or chloro, naphthyl unsubstituted or substituted by hydroxy, carboxy, sulfo, $C_1$-$C_4$ alkyl, $C_1$-$C_4$ alkoxy, or chloro, or benzyl unsubstituted or substituted by $C_1$-$C_4$ alkyl, $C_1$-$C_4$ alkoxy, sulfo or chloro, the formula (6) being

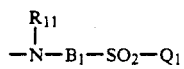

wherein $R_{11}$ is hydrogen or alkyl unsubstituted or substituted by hydroxy, $B_1$ is phenylene unsubstituted or substituted by methyl, ethyl, methoxy, ethoxy, chloro, bromo, sulfo, carboxy, or nitro, or naphthylene unsubstituted or substituted by sulfo, and $Q_1$ is vinyl or —$CH_2CH_2L$, in which L is a group capable of being split by the action of an alkali, the formula (7) being

wherein $R_{12}$, $R_{13}$ and $R_{14}$ independently of one another are each alkyl unsubstituted or substituted by hydroxy, methoxy, ethoxy, diethylamino, carboxy or sulfato, and the formula (8) being

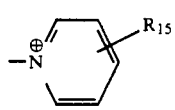

wherein $R_{15}$ is hydrogen, cyano, carbamyol, halogen, hydroxy, vinyl, sulfo, carboxy or alkyl unsubstituted or substituted by hydroxy; and $A_1$ is a group of the following formula (9), (10), (11) or (12), the formula (9) being

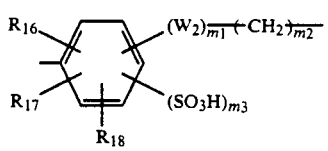

wherein $R_{16}$, $R_{17}$ and $R_{18}$ independently of one another are each hydrogen, methyl, ethyl, methoxy, ethoxy, chloro, bromo or carboxy, $W_2$ is a divalent group of —O—, —S—, —$NR_{19}$— or —$NR_{20}CO$— in which $R_{19}$ and $R_{20}$ independently of one another are each hydrogen or alkyl, $m_1$ is 0 or 1, $m_2$ is 0, 1, 2, 3 or 4, and $m_3$ is 0, 1 or 2, the formula (10) being

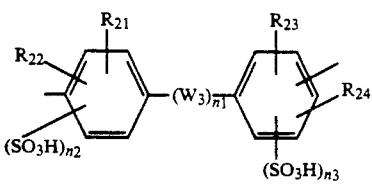

wherein $R_{21}$, $R_{22}$, $R_{23}$ and $R_{24}$ independently of one another are each hydrogen, methyl, ethyl, methoxy, ethoxy, chloro, bromo or carboxy, $W_3$ is a bridging group of —O—, —S—, —NR$_{25}$— or —NR$_{26}$CO— in which $R_{25}$ and $R_{26}$ independently of one another are each hydrogen or alkyl, $n_1$ is 0 or 1, and $n_2$ and $n_3$ independently of one another are each 0, 1 or 2, the formula (11) being

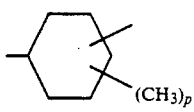

wherein p is 0, 1, 2 or 3, and the formula (12) being

 (12)

wherein q is an integer of 2 to 6;
with the proviso that $R_1$ is hydrogen, $R_2$ is hydrogen or sulfo and U is the group of the formula (4) as defined hereinabove, when X is sulfo.

2. The compound according of claim 1, wherein $R_1$ is hydrogen, and $R_2$ is hydrogen or sulfo.

3. The compound according to claim 1, wherein the divalent group represented by $V_1$ is —S—.

4. The compound according to claim 1, which is represented by the following formula (II),

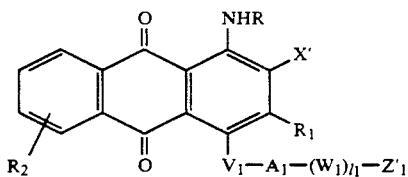

wherein X' is hydrogen, halogen, alkyl or carboxy, $Z_1'$ is a fiber reactive group, and R, $R_1$, $R_2$, $V_1$, $A_1$, $W_1$ and $l_1$ are ad defined in claim 1.

5. The compound according to claim 1, wherein R is hydrogen, methyl, ethyl, propyl, iso-propyl, butyl, iso-butyl carboxymethyl, 2-carboxyethyl, 2-sulfoethyl, 2-methoxyethyl, 2-ethoxyethyl, 2-hydroxyethyl, 2-sulfatoethyl, cyclohexyl, phenyl, 2-, 3- or 4-sulfophenyl, 2-, 3- or 4-methylphenyl, 2-, 3- or 4-chlorophenyl, 2-, 3- or 4-methyloxyphenyl, 2-, 3- or 4-carboxyphenyl, acetyl, propionyl, benzoyl, 2-, 3- or 4-sulfobenzoyl, 2-, 3- or 4-carboxybenzoyl, 2-, 3- or 4-chlorobenzoyl, 2-, 3- or 4-methoxybenzoyl, 2-, 3- or 4-methylbenzoyl, methylsulfonyl, ethylsulfonyl, phenylsulfonyl, 2-, 3- or 4-methylphenylsulfonyl, 2-, 3- or 4-chlorophenylsulfonyl, 2-, 3- or 4-sulfophenylsulfonyl, 2-, 3- or 4-carboxyphenylsulfonyl, or 2-, 3- or 4-methoxyphenylsulfonyl.

6. The compound according to claim 1, which is represented by the following formula (IV),

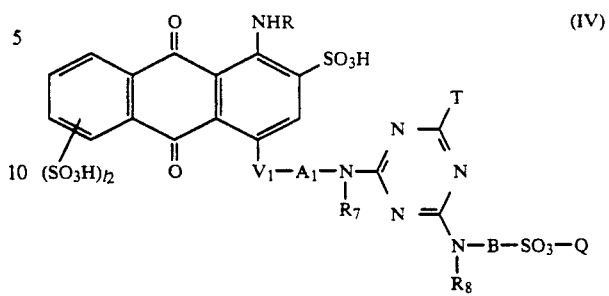

wherein $l_2$ is 0, 1 or 2 and R, $V_1$, $A_1$, $R_7$, $R_8$, B, Q, and T are as defined in claim 1.

7. The compound according to claim 1, wherein U is a group of the formula (3) in which $W_1$ is —NR$_5$— in which $R_5$ is hydrogen, methyl or ethyl.

8. The compound according to claim 1, wherein $A_1$ is a group of the formula (9) in which $W_2$ is —O—, —NH— or —NHCO—, $m_2$ is 0, 1 or 2, and $m_1$ and $m_3$ are each 0 or 1.

9. The compound according to claim 1, wherein $A_1$ is a group of the formula (10) in which $W_3$ is —O—, —NH— or —NHCO—, and $n_2$ and $n_3$ are each 1 or 2.

10. The compound according to claim 1, wherein $A_1$ is a group of the formula (11) in which p is 0, 1 or 2.

11. The compound according to claim 1, wherein $A_1$ is a group of the formula (12) in which q is 2, 3 or 4.

12. The compound according to claim 1, wherein U is a group of the formula (4) in which $R_7$ is hydrogen or methyl, and $R_8$ is hydrogen, methyl or ethyl.

13. The compound according to claim 1, wherein U is a group of the formula (4) in which T is a group of the formula (6) in which $R_{11}$ is hydrogen, methyl or ethyl.

14. The compound according to claim 1, wherein U is a group of the formula (4) in which B is phenylene unsubstituted or substituted by methyl or methoxy, or β-naphthylene unsubstituted or substituted by sulfo.

15. The compound according to claim 1, wherein U is a group of the formula (4) in which T is a group of the formula (5) in which $R_9$ and $R_{10}$ independently of one another are each hydrogen, methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl, phenyl, sulfophenyl, carboxyphenyl, chlorophenyl, disulfophenyl, naphthyl, sulfonaphthyl, disulfonaphthyl, trisulfonaphthyl, benzyl or sulfobenzyl.

16. The compound according to claim 1, wherein U is a group of the formula (4) in which T is a group of the formula (7) in which $R_{12}$ and $R_{13}$ are each methyl, and $R_{14}$ is methyl, ethyl, propyl, butyl, hydroxyethyl, hydroxypropyl, methoxyethyl, ethoxyethyl, 2-diethylaminoethyl, 3-diethylaminopropyl, carboxymethyl or carboxyethyl.

17. The compound according to claim 1, wherein U is a group of the formula (4) in which T is a group of the formula (8) in which $R_{15}$ is hydrogen, carbamoyl or carboxy.

18. The compound according to claim 1, wherein U is a group of the formula (4) in which T is chloro, or T is a group of the formula (5) in which $R_9$ is hydrogen, methyl or ethyl, and $R_{10}$ is phenyl unsubstituted or substituted once or twice by $C_1$-$C_4$ alkyl, $C_1$-$C_4$ alkoxy, sulfo, carboxy or chloro.

19. The compound according to claim 1, wherein the fiber reactive group represented by $Z_1$ is any one of those represented by the following formulas (13) to (17),

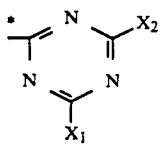 (13)

wherein $X_1$ and $X_2$ independently of one another are each chloro, fluoro,

in which $R_{27}$, $R_{28}$ and $R_{29}$ independently of one another are each alkyl unsubstituted or substituted by hydroxy, methoxy, ethoxy, diethylamino, carboxy or sulfato,

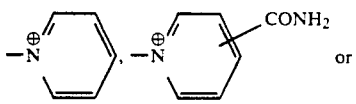 or

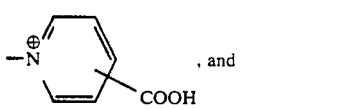, and the asterisked linkage bonds to $W_1$,

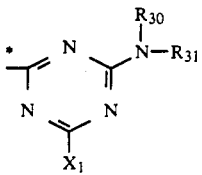 (14)

wherein $R_{30}$ is hydrogen or alkyl unsubstituted or substituted by hydroxy, $R_{31}$ is hydrogen, alkyl unsubstituted or substituted by sulfo, hydroxy, methoxy or phenyl, phenyl unsubstituted or substituted by sulfo, carboxy, methyl, methoxy or chloro, or naphthyl unsubstituted or substituted by sulfo, and $X_1$ and the asterisked linkage are as defined above,

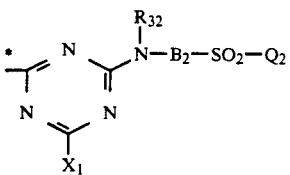 (15)

wherein $R_{32}$ is hydrogen or alkyl unsubstituted or substituted by hydroxy, $B_2$ is phenylene unsubstituted or substituted once or twice by methyl, ethyl, methoxy, ethoxy, chloro, bromo, sulfo, carboxy or nitro, or naphthylene unsubstituted or substituted by sulfo, $Q_2$ is vinyl or —$CH_2CH_2L_2$ in which $L_2$ is a group capable of being split by the action of an alkali, and $X_1$ and the asterisked linkage are as defined above,

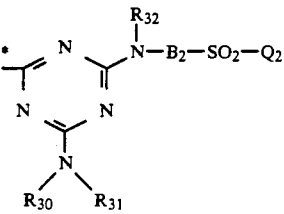 (16)

wherein $R_{30}$, $R_{31}$ $R_{32}$, $B_2$, $Q_2$ and the asterisked linkage are as defined above, and

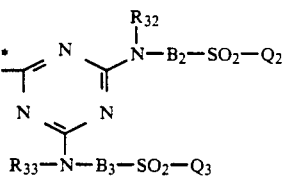 (17)

wherein $R_{33}$ is hydrogen or alkyl unsubstituted or substituted by hydroxy, $B_3$ is phenylene unsubstituted or substituted once or twice by methyl, ethyl, methoxy, ethoxy, chloro, bromo, sulfo, carboxy or nitro, or naphthylene unsubstituted or substituted by sulfo, $Q_3$ is vinyl or —$CH_2CH_2L_3$ in which $L_3$ is a group capable of being split by the action of an alkali, and $R_{32}$, $B_2$, $Q_2$ and the asterisked linkage are as defined above.

20. The compound according to claim 19, wherein the fiber reactive group is represented by the formula (15) in which $X_1$ is chloro, $R_{32}$ is hydrogen, methyl or ethyl, $B_2$ is phenylene unsubstituted or substituted by methyl or methoxy, or $\beta$-naphthylene unsubstituted or substituted by sulfo, and $Q_2$ is vinyl or $\beta$-sulfatoethyl.

21. The compound according to claim 19, wherein the fiber reactive group is represented by the formula (16) in which $R_{30}$ is hydrogen, methyl or ethyl, $R_{31}$ is phenyl unsubstituted or substituted by sulfo, carboxy, methyl, methoxy or chloro, $R_{32}$ is hydrogen, methyl or ethyl, $B_2$ is phenylene unsubstituted or substituted by methyl or methoxy, or $\beta$-naphthylene unsubstituted or substituted by sulfo, and $Q_2$ is vinyl or $\beta$-sulfatoethyl.

22. The compound according to claim 19, wherein the fiber reactive group is represented by the formula (17) in which $R_{32}$ and $R_{33}$ independently of one another are each hydrogen, methyl or ethyl, $B_2$ and $B_3$ independently of one another are each phenylene unsubstituted or substituted by methyl or methoxy, or $\beta$-naphthalene unsubstituted or substituted by sulfo, and $Q_2$ and $Q_3$ independently of one another are each vinyl or $\beta$-sulfatoethyl.

23. A process for dyeing or printing fiber materials, which comprises using the compound of claim 1.

24. Fiber materials dyed by the process of claim 11.

* * * * *